US008117542B2

(12) United States Patent
Radtke et al.

(10) Patent No.: US 8,117,542 B2
(45) Date of Patent: Feb. 14, 2012

(54) USER INTERFACE FOR DISPLAYING SELECTABLE SOFTWARE FUNCTIONALITY CONTROLS THAT ARE CONTEXTUALLY RELEVANT TO A SELECTED OBJECT

(75) Inventors: Roland Radtke, Seattle, WA (US); Aaron M. Butcher, Duvall, WA (US); Jensen M. Harris, Kirkland, WA (US); Catherine R. Morrow, Seattle, WA (US); Jesse Clay Satterfield, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 258 days.

(21) Appl. No.: 10/955,940

(22) Filed: Sep. 30, 2004

(65) Prior Publication Data
US 2006/0036945 A1   Feb. 16, 2006

Related U.S. Application Data

(60) Provisional application No. 60/601,815, filed on Aug. 16, 2004.

(51) Int. Cl.
*G06F 3/00* (2006.01)
*G06F 3/048* (2006.01)

(52) U.S. Cl. ......... 715/708; 715/777; 715/810; 715/821

(58) Field of Classification Search ................... 715/810, 715/821, 708, 777
See application file for complete search history.

(56) References Cited

U.S. PATENT DOCUMENTS

| | | | |
|---|---|---|---|
| 4,823,283 A | 4/1989 | Diehm et al. | 715/825 |
| 5,155,806 A | 10/1992 | Hoeber et al. | 715/711 |
| 5,220,675 A | 6/1993 | Padawer et al. | |
| 5,247,438 A | 9/1993 | Subas et al. | 700/90 |
| 5,323,314 A | 6/1994 | Baber et al. | 705/8 |
| 5,377,354 A | 12/1994 | Scannell et al. | 718/103 |
| 5,412,772 A | 5/1995 | Monson | |
| 5,461,708 A | 10/1995 | Kahn | |
| 5,500,936 A | 3/1996 | Allen et al. | 395/156 |
| 5,519,606 A | 5/1996 | Frid-Nielsen et al. | 705/9 |
| 5,559,875 A | 9/1996 | Bieselin et al. | 379/202.01 |

(Continued)

FOREIGN PATENT DOCUMENTS

EP   0 910 007   4/1999

(Continued)

OTHER PUBLICATIONS

Microsoft Office Word 2003 Part of Microsoft Office Professional Edition 2003, screen shot 1.*

(Continued)

*Primary Examiner* — William Bashore
*Assistant Examiner* — Henry Orr
(74) *Attorney, Agent, or Firm* — Merchant & Gould

(57) ABSTRACT

An improved user interface is provided for displaying selectable functionality controls that identifies the context of the object to which the user interface is relevant, which contains rich functionality controls for applying contextually relevant functionality to a selected object, and which may be efficiently switched to a different context for applying a different set of functionalities to a different or neighboring editable object. A context menu of functionalities is displayed adjacent to a selected object where the menu of functionalities includes functionalities associated with editing the selected object. The context menu includes an identification of the object context and a control for selectively changing the context and associated functionalities of the menu to a different object context for displaying a different set of functionalities associated with the different context.

28 Claims, 9 Drawing Sheets

U.S. PATENT DOCUMENTS

| | | | |
|---|---|---|---|
| 5,559,944 A | 9/1996 | Ono | 715/841 |
| 5,570,109 A | 10/1996 | Jenson | 715/823 |
| 5,581,677 A | 12/1996 | Myers et al. | |
| 5,588,107 A | 12/1996 | Bowden et al. | 715/828 |
| 5,592,602 A | 1/1997 | Edmunds | |
| 5,596,694 A | 1/1997 | Capps | 345/473 |
| 5,625,783 A | 4/1997 | Ezekiel et al. | 395/352 |
| 5,634,100 A | 5/1997 | Capps | 705/9 |
| 5,634,128 A | 5/1997 | Messina | 710/200 |
| 5,638,504 A | 6/1997 | Scott et al. | 715/202 |
| 5,644,737 A | 7/1997 | Tuniman et al. | 715/810 |
| 5,659,693 A | 8/1997 | Hansen et al. | 715/779 |
| 5,664,127 A | 9/1997 | Anderson et al. | 715/776 |
| 5,664,208 A | 9/1997 | Pavley et al. | 715/209 |
| 5,673,403 A | 9/1997 | Brown et al. | 715/744 |
| 5,721,847 A | 2/1998 | Johnson | 395/333 |
| 5,734,915 A | 3/1998 | Roewer | 395/773 |
| 5,760,768 A | 6/1998 | Gram | 345/333 |
| 5,760,773 A | 6/1998 | Berman et al. | 715/808 |
| 5,761,646 A | 6/1998 | Frid-Nielsen et al. | 705/9 |
| 5,778,402 A | 7/1998 | Gipson | 707/530 |
| 5,778,404 A | 7/1998 | Capps et al. | 715/531 |
| 5,787,295 A | 7/1998 | Nakao | 715/210 |
| 5,793,365 A | 8/1998 | Tang et al. | 715/758 |
| 5,805,167 A | 9/1998 | Van Cruyningen | 715/808 |
| 5,812,132 A | 9/1998 | Goldstein | 715/797 |
| 5,821,936 A | 10/1998 | Shaffer et al. | 715/810 |
| 5,828,376 A * | 10/1998 | Solimene et al. | 715/821 |
| 5,838,321 A | 11/1998 | Wolf | 345/343 |
| 5,842,009 A | 11/1998 | Borovoy et al. | 707/1 |
| 5,844,558 A | 12/1998 | Kumar et al. | 345/339 |
| 5,844,572 A | 12/1998 | Schott | 345/440 |
| 5,855,006 A | 12/1998 | Huemoeller et al. | 705/9 |
| 5,872,973 A | 2/1999 | Mitchell et al. | |
| 5,873,108 A | 2/1999 | Goyal et al. | 715/203 |
| 5,885,006 A | 3/1999 | Sheedy | 384/192 |
| 5,893,073 A | 4/1999 | Kasso et al. | 705/8 |
| 5,893,125 A | 4/1999 | Shostak | 715/206 |
| 5,898,436 A | 4/1999 | Stewart et al. | 345/354 |
| 5,899,979 A | 5/1999 | Miller et al. | 705/9 |
| 5,905,863 A | 5/1999 | Knowles et al. | 709/206 |
| 5,926,806 A | 7/1999 | Marshall et al. | 707/3 |
| 5,936,625 A | 8/1999 | Kahl et al. | 715/775 |
| 5,937,160 A | 8/1999 | Davis et al. | 709/203 |
| 5,940,078 A | 8/1999 | Nagarajayya et al. | 345/346 |
| 5,940,847 A | 8/1999 | Fein et al. | 707/540 |
| 5,943,051 A | 8/1999 | Onda et al. | 715/786 |
| 5,960,406 A | 9/1999 | Rasansky et al. | 705/9 |
| 5,970,466 A | 10/1999 | Detjen et al. | 705/8 |
| 5,999,173 A | 12/1999 | Ubillos | |
| 5,999,938 A | 12/1999 | Bliss et al. | 707/102 |
| 6,008,806 A | 12/1999 | Nakajima et al. | 345/335 |
| 6,012,075 A | 1/2000 | Fein et al. | 707/540 |
| 6,016,478 A | 1/2000 | Zhang et al. | 705/9 |
| 6,018,343 A | 1/2000 | Wang et al. | 345/356 |
| 6,034,683 A | 3/2000 | Mansour et al. | 715/764 |
| 6,038,395 A | 3/2000 | Chow et al. | |
| 6,038,542 A | 3/2000 | Ruckdashel | 705/9 |
| 6,067,087 A | 5/2000 | Krauss et al. | 715/762 |
| 6,067,551 A | 5/2000 | Brown et al. | 1/1 |
| 6,072,492 A | 6/2000 | Schagen et al. | 715/733 |
| 6,073,142 A | 6/2000 | Geiger et al. | |
| 6,085,206 A | 7/2000 | Domini et al. | 707/533 |
| 6,101,480 A | 8/2000 | Conmy et al. | 705/9 |
| 6,133,915 A * | 10/2000 | Arcuri et al. | 715/779 |
| 6,175,363 B1 | 1/2001 | Williams et al. | 345/334 |
| 6,188,403 B1 | 2/2001 | Sacerdoti et al. | 715/764 |
| 6,192,381 B1 | 2/2001 | Stiegemeier et al. | 707/505 |
| 6,195,094 B1 | 2/2001 | Celebiler | 715/764 |
| 6,199,102 B1 | 3/2001 | Cobb | |
| 6,211,879 B1 | 4/2001 | Soohoo | 345/357 |
| 6,216,122 B1 | 4/2001 | Elson | 707/3 |
| 6,219,670 B1 | 4/2001 | Mocek et al. | 707/102 |
| 6,222,540 B1 | 4/2001 | Sacerdoti | 345/440 |
| 6,232,971 B1 | 5/2001 | Haynes | 345/340 |
| 6,236,396 B1 | 5/2001 | Jenson et al. | 715/764 |
| 6,237,135 B1 | 5/2001 | Timbol | |
| 6,256,628 B1 | 7/2001 | Dobson et al. | 707/6 |
| 6,269,341 B1 | 7/2001 | Redcay, Jr. | 705/8 |
| 6,278,450 B1 | 8/2001 | Arcuri et al. | 345/334 |
| 6,289,317 B1 | 9/2001 | Peterson | 705/7 |
| 6,307,544 B1 * | 10/2001 | Harding | 715/709 |
| 6,307,574 B1 | 10/2001 | Ashe | |
| 6,323,883 B1 | 11/2001 | Minoura et al. | 715/784 |
| 6,326,962 B1 | 12/2001 | Szabo | 715/762 |
| 6,327,046 B1 | 12/2001 | Miyamoto et al. | 358/1.15 |
| 6,341,277 B1 | 1/2002 | Coden et al. | 707/718 |
| 6,353,451 B1 | 3/2002 | Teibel et al. | 345/803 |
| 6,359,634 B1 | 3/2002 | Cragun et al. | 715/777 |
| 6,373,507 B1 | 4/2002 | Camara et al. | 345/825 |
| 6,384,849 B1 | 5/2002 | Morcos et al. | 715/810 |
| 6,385,769 B1 | 5/2002 | Lewallen | |
| 6,405,216 B1 | 6/2002 | Minnaert et al. | 707/104.1 |
| 6,424,829 B1 | 7/2002 | Kraft | 455/412.1 |
| 6,429,882 B1 | 8/2002 | Abdelnur et al. | 345/763 |
| 6,430,563 B1 | 8/2002 | Fritz et al. | 707/694 |
| 6,433,801 B1 | 8/2002 | Moon et al. | 345/840 |
| 6,433,831 B1 | 8/2002 | Dinnwiddie et al. | 348/553 |
| 6,434,598 B1 | 8/2002 | Gish | 709/203 |
| 6,442,527 B1 | 8/2002 | Worthington | 705/8 |
| 6,456,304 B1 | 9/2002 | Angiulo et al. | 345/779 |
| 6,457,062 B1 | 9/2002 | Pivowar et al. | 709/248 |
| 6,459,441 B1 | 10/2002 | Perroux et al. | 345/837 |
| 6,466,236 B1 | 10/2002 | Pivowar et al. | 715/835 |
| 6,469,722 B1 | 10/2002 | Kinoe et al. | 345/837 |
| 6,469,723 B1 | 10/2002 | Gould | |
| 6,480,865 B1 | 11/2002 | Lee et al. | 715/523 |
| 6,484,180 B1 | 11/2002 | Lyons et al. | 1/1 |
| 6,493,006 B1 * | 12/2002 | Gourdol et al. | 715/825 |
| 6,493,731 B1 | 12/2002 | Jones et al. | 707/501.1 |
| 6,507,845 B1 | 1/2003 | Cohen et al. | 707/608 |
| 6,546,417 B1 | 4/2003 | Baker | 709/206 |
| 6,570,596 B2 | 5/2003 | Frederiksen | 715/808 |
| 6,578,192 B1 | 6/2003 | Boehme et al. | 717/115 |
| 6,583,798 B1 * | 6/2003 | Hoek et al. | 715/822 |
| 6,618,732 B1 | 9/2003 | White et al. | 707/103 |
| 6,621,504 B1 | 9/2003 | Nadas et al. | 715/723 |
| 6,621,508 B1 | 9/2003 | Shiraishi et al. | 715/810 |
| 6,635,089 B1 | 10/2003 | Burkett et al. | 715/513 |
| 6,664,983 B2 | 12/2003 | Ludolph | 715/775 |
| 6,680,749 B1 | 1/2004 | Anderson et al. | 348/231.99 |
| 6,686,938 B1 | 2/2004 | Jobs et al. | 345/835 |
| 6,691,281 B1 | 2/2004 | Sorge et al. | 715/503 |
| 6,701,513 B1 | 3/2004 | Bailey | |
| 6,708,205 B2 | 3/2004 | Sheldon et al. | 709/206 |
| 6,721,402 B2 | 4/2004 | Usami | |
| 6,727,919 B1 | 4/2004 | Reder et al. | 715/810 |
| 6,732,330 B1 | 5/2004 | Claussen et al. | 715/513 |
| 6,734,880 B2 | 5/2004 | Chang et al. | 715/738 |
| 6,750,890 B1 | 6/2004 | Sugimoto | 715/838 |
| 6,785,868 B1 | 8/2004 | Raff | 715/530 |
| 6,789,107 B1 | 9/2004 | Bates et al. | |
| 6,825,859 B1 | 11/2004 | Severenuk et al. | 345/764 |
| 6,826,729 B1 | 11/2004 | Giesen et al. | 715/837 |
| 6,850,255 B2 | 2/2005 | Muschetto | 715/788 |
| 6,871,195 B2 | 3/2005 | Ryan et al. | 706/46 |
| 6,882,354 B1 | 4/2005 | Nielsen | 715/784 |
| 6,895,426 B1 | 5/2005 | Cortright et al. | |
| 6,904,449 B1 | 6/2005 | Quinones | 709/203 |
| 6,906,717 B2 | 6/2005 | Couckuyt et al. | 345/440 |
| 6,915,492 B2 | 7/2005 | Kurtenbach et al. | 715/810 |
| 6,924,797 B1 | 8/2005 | MacPhail | 345/326 |
| 6,925,605 B2 | 8/2005 | Bates et al. | 709/206 |
| 6,928,613 B1 | 8/2005 | Ishii | |
| 6,941,304 B2 | 9/2005 | Gainey et al. | |
| 6,964,025 B2 | 11/2005 | Angiulo | 715/838 |
| 6,983,889 B2 | 1/2006 | Alles | 236/49.1 |
| 6,988,241 B1 | 1/2006 | Guttman et al. | 715/503 |
| 6,990,637 B2 | 1/2006 | Anthony et al. | 715/851 |
| 6,990,652 B1 | 1/2006 | Parthasarathy et al. | |
| 7,027,463 B2 | 4/2006 | Mathew et al. | |
| 7,032,210 B2 | 4/2006 | Alloing et al. | 717/106 |
| 7,039,596 B1 | 5/2006 | Lu | 705/8 |
| 7,046,848 B1 | 5/2006 | Olcott | 382/176 |
| 7,069,538 B1 | 6/2006 | Renshaw | |
| 7,107,544 B1 | 9/2006 | Luke | 715/752 |
| 7,110,936 B2 | 9/2006 | Hiew et al. | 703/22 |

| | | | | | | |
|---|---|---|---|---|---|---|
| 7,111,238 B1 | 9/2006 | Kuppusamy et al. | | 2002/0196293 A1 | 12/2002 | Suppan et al. ............... 345/853 |
| 7,117,370 B2 | 10/2006 | Khan et al. ................... 713/186 | | 2003/0009455 A1 | 1/2003 | Carlson et al. .................. 707/6 |
| 7,149,983 B1 | 12/2006 | Robertson et al. ........... 715/810 | | 2003/0011638 A1 | 1/2003 | Chung ......................... 345/808 |
| 7,152,207 B1 | 12/2006 | Underwood et al. ......... 715/526 | | 2003/0011639 A1* | 1/2003 | Webb ........................... 345/808 |
| 7,181,697 B2 | 2/2007 | Tai et al. ...................... 715/779 | | 2003/0014421 A1 | 1/2003 | Jung ............................ 707/102 |
| 7,188,073 B1 | 3/2007 | Tam et al. ........................ 705/9 | | 2003/0014490 A1 | 1/2003 | Bates et al. .................. 709/206 |
| 7,188,317 B1 | 3/2007 | Hazel ........................... 715/804 | | 2003/0022700 A1 | 1/2003 | Wang ........................... 455/566 |
| 7,206,813 B2 | 4/2007 | Dunbar et al. | | 2003/0025732 A1 | 2/2003 | Prichard ...................... 345/765 |
| 7,206,814 B2 | 4/2007 | Kirsch | | 2003/0035917 A1 | 2/2003 | Hyman ........................... 428/67 |
| 7,212,208 B2 | 5/2007 | Khozai ........................ 345/440 | | 2003/0038832 A1 | 2/2003 | Sobol |
| 7,216,301 B2 | 5/2007 | Moehrle ...................... 715/811 | | 2003/0043200 A1 | 3/2003 | Faieta et al. ................. 345/804 |
| 7,219,305 B2 | 5/2007 | Jennings ...................... 715/761 | | 2003/0043211 A1 | 3/2003 | Kremer et al. |
| 7,240,323 B1 | 7/2007 | Desai et al. .................. 717/100 | | 2003/0046528 A1 | 3/2003 | Haitani et al. ................... 713/2 |
| 7,249,325 B1 | 7/2007 | Donaldson ................... 715/777 | | 2003/0066025 A1 | 4/2003 | Garner et al. ................ 715/500 |
| 7,263,668 B1 | 8/2007 | Lentz ........................... 715/801 | | 2003/0070143 A1 | 4/2003 | Maslov ........................ 715/513 |
| 7,290,033 B1 | 10/2007 | Goldman et al. ............ 709/206 | | 2003/0093490 A1 | 5/2003 | Yamamoto et al. .......... 709/213 |
| 7,296,241 B2 | 11/2007 | Oshiro et al. | | 2003/0097361 A1 | 5/2003 | Huang et al. ................... 707/10 |
| 7,325,204 B2 | 1/2008 | Rogers ......................... 715/792 | | 2003/0097640 A1 | 5/2003 | Abrams et al. ............... 715/530 |
| 7,328,409 B2 | 2/2008 | Awada et al. ................ 715/765 | | 2003/0098891 A1 | 5/2003 | Molander ..................... 715/841 |
| 7,337,185 B2 | 2/2008 | Ellis et al. .................... 707/102 | | 2003/0106024 A1 | 6/2003 | Silverbrook et al. ......... 715/515 |
| 7,346,705 B2 | 3/2008 | Hullot et al. ................. 709/238 | | 2003/0110191 A1 | 6/2003 | Handsaker et al. .......... 707/503 |
| 7,346,769 B2 | 3/2008 | Forlenza et al. ............. 713/151 | | 2003/0112278 A1 | 6/2003 | Driskell ....................... 715/788 |
| 7,356,772 B2 | 4/2008 | Brownholtz et al. ......... 715/752 | | 2003/0135825 A1 | 7/2003 | Gertner et al. ............... 715/513 |
| 7,386,535 B1 | 6/2008 | Kalucha et al. | | 2003/0156140 A1 | 8/2003 | Watanabe ..................... 345/810 |
| 7,392,249 B1 | 6/2008 | Harris et al. | | 2003/0160821 A1 | 8/2003 | Yoon ............................ 345/762 |
| 7,395,221 B2 | 7/2008 | Doss et al. ....................... 705/9 | | 2003/0163537 A1 | 8/2003 | Rohall et al. ................. 709/206 |
| 7,395,500 B2 | 7/2008 | Whittle et al. | | 2003/0167310 A1 | 9/2003 | Moody et al. ................ 709/206 |
| 7,421,660 B2 | 9/2008 | Charnock et al. ............ 715/751 | | 2003/0169284 A1 | 9/2003 | Dettinger et al. ................ 707/3 |
| 7,421,690 B2 | 9/2008 | Forstall et al. ............... 709/206 | | 2003/0195937 A1 | 10/2003 | Kircher et al. ............... 709/207 |
| 7,469,385 B2 | 12/2008 | Harper et al. | | 2003/0206646 A1 | 11/2003 | Brackett |
| 7,472,117 B2 | 12/2008 | Dettinger et al. ................. 1/1 | | 2003/0218611 A1 | 11/2003 | Ben-Tovim et al. .......... 345/440 |
| 7,499,907 B2 | 3/2009 | Brown et al. ..................... 1/1 | | 2003/0226106 A1 | 12/2003 | McKellar et al. ............ 715/513 |
| 7,505,954 B2 | 3/2009 | Heidloff et al. ................. 707/1 | | 2003/0227487 A1 | 12/2003 | Hugh ........................... 715/777 |
| 7,530,029 B2 | 5/2009 | Satterfield et al. ........... 715/772 | | 2003/0233419 A1 | 12/2003 | Beringer ...................... 709/206 |
| 7,555,707 B1 | 6/2009 | Labarge et al. .............. 715/234 | | 2004/0003351 A1 | 1/2004 | Sommerer et al. ........... 715/251 |
| 7,567,964 B2 | 7/2009 | Brice et al. ...................... 707/9 | | 2004/0006570 A1 | 1/2004 | Gelb et al. ................... 707/102 |
| 7,627,561 B2 | 12/2009 | Pell et al. .......................... 707/3 | | 2004/0012633 A1 | 1/2004 | Helt |
| 7,664,821 B1 | 2/2010 | Ancin et al. ................. 709/206 | | 2004/0030993 A1 | 2/2004 | Hong et al. |
| 7,703,036 B2 | 4/2010 | Satterfield et al. ........... 715/777 | | 2004/0056894 A1 | 3/2004 | Zaika et al. .................. 345/762 |
| 7,707,255 B2 | 4/2010 | Satterfield et al. ........... 709/206 | | 2004/0083432 A1 | 4/2004 | Kawamura et al. .......... 715/526 |
| 7,711,742 B2 | 5/2010 | Bennett et al. ............... 707/759 | | 2004/0088359 A1 | 5/2004 | Simpson |
| 7,716,593 B2 | 5/2010 | Durazo et al. ............... 715/752 | | 2004/0090315 A1 | 5/2004 | Mackjust et al. ......... 340/426.13 |
| 7,739,259 B2 | 6/2010 | Hartwell et al. ............. 707/706 | | 2004/0100504 A1* | 5/2004 | Sommer ....................... 345/810 |
| 7,747,966 B2 | 6/2010 | Leukart et al. ............... 715/792 | | 2004/0100505 A1 | 5/2004 | Cazier .......................... 345/811 |
| 7,788,598 B2 | 8/2010 | Bansal et al. ................ 715/810 | | 2004/0107197 A1 | 6/2004 | Shen et al. ...................... 707/9 |
| 7,802,199 B2 | 9/2010 | Shneerson et al. | | 2004/0109025 A1 | 6/2004 | Hullot et al. ................. 715/764 |
| 7,831,902 B2 | 11/2010 | Sourov et al. ................ 715/220 | | 2004/0109033 A1 | 6/2004 | Vienneau et al. ............ 345/863 |
| 7,853,877 B2 | 12/2010 | Giesen et al. ................ 715/711 | | 2004/0117451 A1 | 6/2004 | Chung ......................... 709/207 |
| 7,865,868 B2 | 1/2011 | Falzone Schaw et al. | | 2004/0119760 A1 | 6/2004 | Grossman et al. ........... 715/854 |
| 7,870,465 B2 | 1/2011 | VerSteeg ...................... 714/774 | | 2004/0122789 A1 | 6/2004 | Ostertag et al. |
| 7,886,290 B2 | 2/2011 | Dhanjal et al. ............... 717/170 | | 2004/0125142 A1 | 7/2004 | Mock et al. .................. 345/765 |
| 7,895,531 B2 | 2/2011 | Radtke et al. ................ 715/810 | | 2004/0128275 A1 | 7/2004 | Moehrle .......................... 707/1 |
| 2001/0032220 A1 | 10/2001 | Van Hoff ..................... 707/513 | | 2004/0133854 A1 | 7/2004 | Black ........................... 715/517 |
| 2001/0035882 A1 | 11/2001 | Stoakley et al. .............. 715/779 | | 2004/0142720 A1 | 7/2004 | Smethers ................... 455/550.1 |
| 2001/0049677 A1 | 12/2001 | Talib et al. ....................... 707/3 | | 2004/0153968 A1 | 8/2004 | Ching et al. ................. 715/513 |
| 2002/0007380 A1 | 1/2002 | Bauchot et al. .............. 707/530 | | 2004/0164983 A1 | 8/2004 | Khozai ......................... 345/440 |
| 2002/0029247 A1 | 3/2002 | Kawamoto ................... 709/206 | | 2004/0168153 A1 | 8/2004 | Marvin ........................ 717/120 |
| 2002/0037754 A1 | 3/2002 | Hama et al. .................. 455/566 | | 2004/0186775 A1* | 9/2004 | Margiloff et al. ............... 705/14 |
| 2002/0052721 A1 | 5/2002 | Ruff et al. ........................ 703/1 | | 2004/0189694 A1 | 9/2004 | Kurtz et al. |
| 2002/0052880 A1 | 5/2002 | Fruensgaard et al. ...... 707/104.1 | | 2004/0192440 A1 | 9/2004 | Evans et al. |
| 2002/0070977 A1 | 6/2002 | Morcos et al. ............... 345/810 | | 2004/0215612 A1 | 10/2004 | Brody .............................. 707/3 |
| 2002/0075330 A1 | 6/2002 | Rosenzweig et al. ........ 345/854 | | 2004/0221234 A1 | 11/2004 | Imai ............................. 715/256 |
| 2002/0078143 A1 | 6/2002 | DeBoor et al. | | 2004/0230508 A1 | 11/2004 | Minnis et al. .................. 705/35 |
| 2002/0083054 A1 | 6/2002 | Peltonen et al. .................. 707/5 | | 2004/0230906 A1 | 11/2004 | Pik et al. ...................... 715/522 |
| 2002/0091697 A1 | 7/2002 | Huang et al. ................... 707/10 | | 2004/0239700 A1 | 12/2004 | Bacshy ......................... 715/781 |
| 2002/0091739 A1 | 7/2002 | Ferlitsch et al. .............. 707/526 | | 2004/0243938 A1 | 12/2004 | Weise et al. .................. 715/205 |
| 2002/0122071 A1 | 9/2002 | Camara et al. | | 2004/0260756 A1 | 12/2004 | Forstall et al. |
| 2002/0133557 A1 | 9/2002 | Winarski ..................... 709/207 | | 2004/0261013 A1 | 12/2004 | Wynn et al. .................. 715/511 |
| 2002/0135621 A1* | 9/2002 | Angiulo et al. .............. 345/838 | | 2004/0268231 A1 | 12/2004 | Tunning ....................... 715/513 |
| 2002/0140731 A1 | 10/2002 | Subramaniam et al. ...... 345/762 | | 2004/0268270 A1 | 12/2004 | Hill et al. ..................... 715/963 |
| 2002/0140740 A1 | 10/2002 | Chen | | 2005/0004989 A1 | 1/2005 | Satterfield et al. ........... 709/206 |
| 2002/0149623 A1* | 10/2002 | West et al. ................... 345/765 | | 2005/0004990 A1 | 1/2005 | Durazo et al. ............... 709/206 |
| 2002/0149629 A1 | 10/2002 | Craycroft et al. ............ 345/861 | | 2005/0005235 A1 | 1/2005 | Satterfield et al. ........... 715/519 |
| 2002/0154178 A1 | 10/2002 | Barnett et al. ................ 715/853 | | 2005/0005249 A1 | 1/2005 | Hill et al. ..................... 715/963 |
| 2002/0158876 A1 | 10/2002 | Janssen ......................... 345/504 | | 2005/0010871 A1 | 1/2005 | Ruthfield et al. ............. 715/712 |
| 2002/0163538 A1 | 11/2002 | Shteyn ......................... 345/752 | | 2005/0021504 A1 | 1/2005 | Atchison .......................... 707/3 |
| 2002/0175938 A1 | 11/2002 | Hackworth ................... 345/751 | | 2005/0022116 A1 | 1/2005 | Bowman et al. ............. 715/513 |
| 2002/0175955 A1* | 11/2002 | Gourdol et al. .............. 345/821 | | 2005/0033614 A1 | 2/2005 | Lettovsky et al. ............... 705/5 |
| 2002/0186257 A1 | 12/2002 | Cadiz et al. .................. 715/764 | | 2005/0039142 A1 | 2/2005 | Jalon et al. ................... 715/823 |

| Publication No. | Date | Inventor | Class |
|---|---|---|---|
| 2005/0043015 A1 | 2/2005 | Muramatsu | 455/412.1 |
| 2005/0044500 A1 | 2/2005 | Orimoto et al. | 715/706 |
| 2005/0055449 A1 | 3/2005 | Rappold, III | 709/228 |
| 2005/0057584 A1 | 3/2005 | Gruen et al. | 345/752 |
| 2005/0086135 A1 | 4/2005 | Lu | 705/30 |
| 2005/0091576 A1 | 4/2005 | Relyea et al. | |
| 2005/0097465 A1 | 5/2005 | Giesen et al. | 715/700 |
| 2005/0114778 A1 | 5/2005 | Branson et al. | 715/711 |
| 2005/0117179 A1 | 6/2005 | Ito et al. | 358/1.15 |
| 2005/0132010 A1 | 6/2005 | Muller | |
| 2005/0132053 A1 | 6/2005 | Roth et al. | 709/227 |
| 2005/0138576 A1 | 6/2005 | Baumert et al. | 715/862 |
| 2005/0144241 A1 | 6/2005 | Stata et al. | |
| 2005/0144284 A1 | 6/2005 | Ludwig et al. | 709/226 |
| 2005/0144568 A1 | 6/2005 | Gruen et al. | 715/822 |
| 2005/0172262 A1 | 8/2005 | Lalwani | 717/109 |
| 2005/0177789 A1 | 8/2005 | Abbar et al. | 705/528 |
| 2005/0183008 A1 | 8/2005 | Crider et al. | 715/517 |
| 2005/0203975 A1 | 9/2005 | Jindal et al. | 707/204 |
| 2005/0216863 A1 | 9/2005 | Schumacher et al. | 715/827 |
| 2005/0223066 A1 | 10/2005 | Buchheit et al. | |
| 2005/0223329 A1 | 10/2005 | Schwartz et al. | 715/711 |
| 2005/0234910 A1 | 10/2005 | Buchheit et al. | |
| 2005/0251757 A1 | 11/2005 | Farn | |
| 2005/0256867 A1 | 11/2005 | Walther et al. | 707/5 |
| 2005/0278656 A1 | 12/2005 | Goldthwaite et al. | 715/810 |
| 2005/0289109 A1 | 12/2005 | Arrouye et al. | 707/1 |
| 2005/0289156 A1 | 12/2005 | Maryka et al. | 707/100 |
| 2005/0289158 A1 | 12/2005 | Weiss et al. | 707/100 |
| 2006/0015816 A1 | 1/2006 | Kuehner et al. | 715/744 |
| 2006/0020962 A1 | 1/2006 | Stark | 725/32 |
| 2006/0026033 A1 | 2/2006 | Brydon et al. | 705/1 |
| 2006/0026213 A1 | 2/2006 | Yaskin et al. | 707/200 |
| 2006/0026242 A1 | 2/2006 | Kuhlmann et al. | |
| 2006/0036580 A1 | 2/2006 | Stata | 707/3 |
| 2006/0036945 A1* | 2/2006 | Radtke et al. | 715/708 |
| 2006/0036946 A1 | 2/2006 | Radtke et al. | 715/711 |
| 2006/0036950 A1 | 2/2006 | Himberger et al. | 715/732 |
| 2006/0036964 A1 | 2/2006 | Satterfield et al. | 715/777 |
| 2006/0036965 A1 | 2/2006 | Harris et al. | 715/777 |
| 2006/0041545 A1 | 2/2006 | Heidloff et al. | 707/4 |
| 2006/0047644 A1 | 3/2006 | Bocking et al. | |
| 2006/0064434 A1 | 3/2006 | Gilbert et al. | 707/104.1 |
| 2006/0069604 A1 | 3/2006 | Leukart et al. | 705/9 |
| 2006/0069686 A1 | 3/2006 | Beyda et al. | 707/10 |
| 2006/0080303 A1 | 4/2006 | Sargent et al. | 707/3 |
| 2006/0095865 A1 | 5/2006 | Rostom | 715/810 |
| 2006/0101051 A1 | 5/2006 | Carr et al. | 707/102 |
| 2006/0101350 A1 | 5/2006 | Scott | 715/779 |
| 2006/0111931 A1 | 5/2006 | Johnson et al. | 705/1 |
| 2006/0117249 A1 | 6/2006 | Hu et al. | 715/255 |
| 2006/0117302 A1 | 6/2006 | Mercer et al. | 717/131 |
| 2006/0129733 A1 | 6/2006 | Shafron | 715/733 |
| 2006/0132812 A1* | 6/2006 | Barnes et al. | 358/1.11 |
| 2006/0155689 A1 | 7/2006 | Blakeley et al. | 707/3 |
| 2006/0161849 A1 | 7/2006 | Miller et al. | 715/744 |
| 2006/0161863 A1 | 7/2006 | Gallo | 715/810 |
| 2006/0168522 A1 | 7/2006 | Bala | |
| 2006/0173824 A1 | 8/2006 | Bensky | 707/3 |
| 2006/0173961 A1 | 8/2006 | Turski et al. | |
| 2006/0218500 A1 | 9/2006 | Sauve et al. | 715/767 |
| 2006/0242557 A1 | 10/2006 | Nortis, III | 715/234 |
| 2006/0242575 A1 | 10/2006 | Winser | 715/530 |
| 2006/0248012 A1 | 11/2006 | Kircher et al. | 705/50 |
| 2006/0259449 A1 | 11/2006 | Betz et al. | 707/1 |
| 2006/0271869 A1 | 11/2006 | Thanu et al. | 715/764 |
| 2006/0271910 A1 | 11/2006 | Burcham et al. | |
| 2006/0282817 A1 | 12/2006 | Darst et al. | |
| 2006/0294452 A1 | 12/2006 | Matsumoto | 715/236 |
| 2006/0294526 A1 | 12/2006 | Hambrick et al. | 719/315 |
| 2007/0006206 A1 | 1/2007 | Dhanjal et al. | 717/168 |
| 2007/0050182 A1 | 3/2007 | Sneddon et al. | 704/2 |
| 2007/0050401 A1 | 3/2007 | Young et al. | 707/102 |
| 2007/0055936 A1 | 3/2007 | Dhanjal et al. | |
| 2007/0055943 A1 | 3/2007 | McCormack et al. | 715/746 |
| 2007/0061306 A1 | 3/2007 | Pell et al. | 707/3 |
| 2007/0061307 A1 | 3/2007 | Hartwell et al. | 707/3 |
| 2007/0061308 A1 | 3/2007 | Hartwell et al. | 707/3 |
| 2007/0061738 A1 | 3/2007 | Taboada et al. | |
| 2007/0106951 A1 | 5/2007 | McCormack et al. | 715/764 |
| 2007/0143662 A1 | 6/2007 | Carlson et al. | 715/507 |
| 2007/0143671 A1 | 6/2007 | Paterson et al. | 715/209 |
| 2007/0180040 A1 | 8/2007 | Etgen et al. | 709/207 |
| 2007/0185826 A1 | 8/2007 | Brice et al. | 707/1 |
| 2007/0203991 A1 | 8/2007 | Fisher et al. | |
| 2007/0240057 A1 | 10/2007 | Satterfield et al. | 715/705 |
| 2007/0260996 A1 | 11/2007 | Jakobson | 715/781 |
| 2007/0279417 A1 | 12/2007 | Garg et al. | 345/440 |
| 2007/0282956 A1 | 12/2007 | Staats | 709/206 |
| 2007/0300168 A1 | 12/2007 | Bosma et al. | 715/820 |
| 2008/0005686 A1 | 1/2008 | Singh | |
| 2008/0034304 A1 | 2/2008 | Feuerbacher et al. | 715/764 |
| 2008/0040682 A1 | 2/2008 | Sorenson et al. | 715/777 |
| 2008/0052670 A1 | 2/2008 | Espinosa et al. | |
| 2008/0104505 A1 | 5/2008 | Keohane et al. | 715/246 |
| 2008/0109787 A1 | 5/2008 | Wang et al. | |
| 2008/0134138 A1 | 6/2008 | Chamieh et al. | 717/105 |
| 2008/0141242 A1 | 6/2008 | Shapiro | 717/174 |
| 2008/0155555 A1 | 6/2008 | Kwong | 719/315 |
| 2008/0178110 A1 | 7/2008 | Hill et al. | 715/771 |
| 2008/0244440 A1 | 10/2008 | Bailey | |
| 2009/0007003 A1 | 1/2009 | Dukhon et al. | 715/778 |
| 2009/0012984 A1 | 1/2009 | Ravid et al. | 707/101 |
| 2009/0083656 A1 | 3/2009 | Dukhon et al. | 715/781 |
| 2009/0100009 A1 | 4/2009 | Karp | |
| 2009/0106375 A1 | 4/2009 | Carmel et al. | 709/206 |
| 2009/0217192 A1 | 8/2009 | Dean et al. | 715/777 |
| 2009/0222763 A1 | 9/2009 | Dukhon et al. | 715/808 |
| 2009/0319619 A1 | 12/2009 | Affronti | |
| 2009/0319911 A1 | 12/2009 | McCann | |
| 2010/0060645 A1 | 3/2010 | Garg et al. | 345/440 |
| 2010/0180226 A1 | 7/2010 | Satterfield et al. | 715/777 |
| 2010/0191818 A1 | 7/2010 | Satterfield et al. | 709/206 |
| 2010/0211889 A1 | 8/2010 | Durazo et al. | 715/752 |
| 2010/0223575 A1 | 9/2010 | Leukart et al. | 715/779 |
| 2010/0293470 A1 | 11/2010 | Zhao et al. | |
| 2011/0072396 A1 | 3/2011 | Giesen et al. | 715/841 |
| 2011/0138273 A1 | 6/2011 | Radtke et al. | 715/256 |

FOREIGN PATENT DOCUMENTS

| | | |
|---|---|---|
| EP | 1 077 405 A2 | 2/2001 |
| EP | 1 672 518 | 6/2001 |
| EP | 1223503 | 7/2002 |
| EP | 1376337 | 2/2004 |
| EP | 1 462 999 A2 | 9/2004 |
| EP | 1 542 133 A2 | 6/2005 |
| EP | 1 835 434 A1 | 9/2007 |
| GB | 2391148 | 1/2004 |
| ID | P 0027717 | 3/2011 |
| ID | P 0027754 | 3/2011 |
| JP | 05-204579 | 8/1993 |
| JP | 06-342357 | 12/1994 |
| JP | 10-074217 | 3/1998 |
| JP | 10-326171 | 12/1998 |
| JP | 11-175258 | 7/1999 |
| JP | 2001-503893 | 3/2001 |
| JP | 2001-337944 | 12/2001 |
| JP | 2003-101768 | 4/2003 |
| JP | 2003-256302 | 9/2003 |
| JP | 2004-342115 | 12/2004 |
| JP | 2005-236089 | 9/2011 |
| JP | 4832024 | 9/2011 |
| KR | 10-2005-0023805 A | 3/2005 |
| KR | 10-2005-0036702 A | 4/2005 |
| PH | 1-2005-000404 | 8/2011 |
| WO | WO 99/04353 | 1/1999 |
| WO | WO 99/27495 | 6/1999 |
| WO | WO 01/055894 | 8/2001 |
| WO | WO 02/091162 A3 | 11/2002 |
| WO | WO 03/003240 A2 | 9/2003 |
| WO | WO 00/3098500 | 11/2003 |
| WO | WO 2007/033159 A1 | 3/2007 |
| WO | WO 2007/027737 A1 | 8/2007 |
| WO | WO 2008/121718 A1 | 9/2008 |

OTHER PUBLICATIONS

Charles Rich, Candace L. Sidner, "Segmented Interaction History in a Collaborative Interface Agent," 1997 ACM, pp. 23-30.

Andrew Dwelly, "Functions and Dynamic User Interfaces," 1989 ACM, pp. 371-381.
Alias I. Wavefront, "The Hotbox: Efficient Access to a Large Number of Menu-items," ACM 1999, pp. 231-237.
Charles Rich, Candace L. Sidner, "Adding a Collaborative Agent to Graphical User Interfaces," 1996 ACM, pp. 21-30.
U.S. Official Action mailed Dec. 23, 2003 in U.S. Appl. No. 09/896,384.
U.S. Official Action mailed Aug. 24, 2004 in U.S. Appl. No. 09/896,384.
U.S. Appl No. 10/982,073, filed Nov. 5, 2004, entitled "Gallery User Interface Controls".
U.S. Appl. No. 10/836,154, filed Apr. 30, 2004, entitled "Combined Content Selection and Display User Interface".
U.S. Appl. No. 10/848,774, filed May 19, 2004, entitled "Automatic Grouping of Electronic Mail".
Boyce, "Microsoft Outlook Inside Out," 2001, pp. 67, 68, 109, 110, 230, 231, 310, 316-318, 798.
Halvorson and Young, "Microsoft Office XP Inside Out," 2001, pp. 1005-1009, 1015, 1023-1028, 1036-1039, 1093.
Riggsby, McCoy, Haberman and Falciani, "Mastering Lotus Notes and Domino 6," 2003, pp. 135-139.
U.S. Appl. No. 10/851,442, filed May 21, 2004, entitled "Conversation Grouping of Electronic Mail Records".
Riggsby, McCoy, Haberman and Falciani, "Mastering Lotus Notes and Domino 6," 2003, pp. 135-138, 607-612.
U.S. Appl. No. 10/851,506, filed May 21, 2004, entitled "Adaptive Multi-Line View User Interface".
Examination Report, Jul. 25, 2005.
Search Report, Danish Patent and Trademark Office, Sep. 18, 2006.
Written Opinion, Danish Patent and Trademark Office, Sep. 18, 2006.
Search Report, Danish Patent and Trademark Office, Sep. 19, 2006.
U.S. Appl. No. 10/955,967, filed Sep. 30, 2004, entitled "Command User Interface for Displaying Selectable Software Functionality Controls".
U.S. Appl. No. 10/955,942, filed Sep. 30, 2004, entitled "User Interface for Displaying a Gallery of Formatting Options Applicable to a Selected Object".
U.S. Appl. No. 10/955,928, filed Sep. 30, 2004, entitled "User Interface for Providing Task Management and Calendar Information".
U.S. Appl. No. 10/955,967, filed Sep. 30, 2004, entitled "Command User Interface for Displaying Selectable Software Functionality Controls".
U.S. Official Action mailed Apr. 27, 2006 in U.S. Appl. No. 10/800,056.
Amendment to Office Action of Apr. 27, 2006, dated Jul. 27, 2006 in U.S. Appl. No. 10/800,056.
U.S. Official Action mailed Oct. 19, 2006 in U.S. Appl. No. 10/800,056.
Amendment to Office Action of Oct. 19, 2006, dated Jan. 19, 2007 in U.S. Appl. No. 10/800,056.
U.S. Appl. No. U.S. 10/800,056, filed Mar. 12, 2004, entitled "Method and System for Data Binding in a Block Structured User Interface Scripting Language".
Khare and Rifkin, "The Origin of (Document) Species," University of California, 1998 (9 pages).
"Separate Structure and Presentation," http://www.webreference.com/html/tutorial5/I.html, Aug. 20, 1998 (4 pages).
"The Style Attribute and CSS Declarations," http://www.webreference.com/html/tutorial5/2, Aug. 20, 1998 (4 pages).
"What's Hot in Internet Services?," http://www.webreference.com/html/tutorial5/3, Aug. 20, 1998 (3 pages).
"The Style Element & CSS Selectors," http://www.webreference.com/html/tutorial5/4.html, Aug. 20, 1998 (e pages).
http://www/webreference.com/html/tutorial5/5.html, Aug. 20, 1998 (3 pages.
"ID & Class Selectors, Pseudoclasses," http://www.webreference.com/html/tutorial5/6.html, Aug. 20, 1998 (3 pages).
http://www.webreference.com/html/tutorial5/7.html, Aug. 20, 1998 (3 pages).
http://www.webreference.com/html/tutorial5/8.html, Aug. 20, 1998 (2 pages).
"External Style Sheets," http://www.webreference.com/html/tutorial5/10.html, Aug. 20, 1998 (3 pages).
Raman, "Cascaded Speech Style Sheets," 1997 (9 pages).
"Primary Windows," http://www-03.ibm.com/servers/eserver/iseries/navigator/guidelines/primary.html, (23 pages).
"User Interface Standards," http://msdn2.microsoftt.com/en-us/library/aa217660(office.11.d=printer).aspx, Sep. 2001 (5 pages).
"WebSphere Studio Overview," http://researchweb.watson.ibm.com/journal/sj/432/budinsky.html, May 6, 2004 (25 pages).
U.S. Official Action mailed Feb. 14, 2007 in U.S. Appl. No. 10/800,056.
U.S. Appl. No. 11/154,278, filed Jun. 16, 2005 entitled "Cross Version and Cross Product User Interface Compatibility".
U.S. Appl. No. 11/151,686, filed Jun. 13, 2005 entitled "Floating Command Object".
U.S. Appl. No. 11/401,470, filed Apr. 10, 2006 entitled "Command User Interface for Displaying Selectable Functionality Controls in a Database Application".
U.S. Appl. No. 10/607,020, filed Jun. 26, 2003 entitled "Side-by-Side Shared Calendars".
U.S. Appl. No. 10/741,407, filed Dec. 19, 2003 entitled "Methods, Systems, and Computer-Readable Mediums for Providing Persisting and Continuously Updating Search Folders".
U.S. Appl. No. 11/782,059, filed Jul. 24, 2007 entitled "Methods, Systems, and Computer-Readable Mediums for Providing Persisting and Continuously Updating Search Folders".
U.S. Appl. No. 10/955,941, filed Sep. 30, 2004 entitled "An Improved User Interface for Displaying Selectable Software Functionality Controls that are Relevant to a Selected Object".
Gordon Padwick, Using Microsoft Outlook 2000, Que, Sp. Ed., May 1999.
Becker et al., "Virtual Folders: Database Support for Electronic Messages Classification," Pontificia Universidade Catolica do Rio Grande do Sul, Porto Alegre, Brazil, pp. 163-170.
Goldberg et al., "Using Collaborative Filtering to Weave an Information Tapestry," Communication of the ACM, vol. 35, No. 12, pp. 61-70, Dec. 1992.
Liu et al., "Continual Queries for Internet Scale Event-Driven Information Delivery," IEEE Transactions on Knowledge and Data Engineering, vol. 11, Issue 1, pp. 610-628, 1999.
Chen et al., "NiagaraCQ: A Scalable Continuous Query System for Internet Databases," Int. Conf. on Management of Data, Proc. of the 2000 ACM SIGMOD Int. Conf. on Management of Data, pp. 379-390, 2000.
Marshall School of Business: "Workshop IV—Calendar," Files/Outlook/Workshop4, PDF, Apr. 10, 2000, pp. 1-4.
M. Williams, "Programming Windows NT4: Unleashed," Sams Publishing, Indianapolis, 1996, pp. index & 167-185.
"Microsoft Outlook 2000: Introduction to Calendar," Version 2002.03.25, http://www.uakron.edu/its/learning/training/docs/Calendar032502.pdf, Mar. 25, 2002, pp. 1-52.
Screen Dumps of Microsoft Outlook (1999, pp. 1-3).
"To-do List—effective task management software" [on line], Aug. 3, 2004, http://web.archive/org/web/20040804103245/www.htpshareware.com/todolist/changes.txt and http://web.archive.org/web/20040803075026/www.htpshareware.com/todolist/index.htm>.
"Rainy'Rainlendar" [online], Aug. 12, 2004, http://web.archive.org/web20040811043048/www.ipi.fi/~rainy/Rainlendard/Manual.html and http:web.archive.org/web/20040812092939/http://www.ipi.fi/~rainy/index.php?pn=probjects&project=rainlendar>.
Microsoft Windows XP Professional, Version 2002, Service pack 2, 3 pgs.
Camarda, Using Microsoft Word 97, copyright 1997, QUE Corporation, pp. 412, 968.
Australian Search Report dated Jan. 16, 2007 cited in Singapore Application No. 200504474-8.
PCT Search Report dated Feb. 26, 2007 cited in International Application No. PCT/US2006/034993.
European Communicated dated Oct. 20, 2005 cited in EP Application No. 04102463.0-2211 PCT/.
Australian Written Opinion/Search Report cited in Singapore Application No. 200505257-6 mailed Feb. 12, 2007.

U.S. Office Action dated Apr. 12, 2007 cited in U.S. Appl. No. 10/851,506.
U.S. Office Action dated Jul. 26, 2006 cited in U.S. Appl. No. 10/741,407.
U.S. Final Office Action dated Jan. 23, 2007 cited in U.S. Appl. No. 10/741,407.
U.S. Notice of Allowance dated Apr. 10, 2007 cited in U.S. Appl. No. 10/741,407.
U.S. Office Action dated Jan. 4, 2007 cited in U.S. Appl. No. 10/607,020.
U.S. Office Action dated Jun. 14, 2007 cited in U.S. Appl. No. 10/836,154.
U.S. Office Action dated Jun. 21, 2007 cited in U.S. Appl. No. 10/955,928.
U.S. Notice of Allowance dated Jul. 5, 2007 cited in U.S. Appl. No. 10/607,020.
U.S. Office Action dated Jul. 11, 2007 cited in U.S. Appl. No. 10/955,941.
U.S. Office Action dated Jul. 11, 2007 cited in U.S. Appl. No. 10/955,967.
U.S. Office Action dated Jul. 11, 2007 cited in U.S. Appl. No. 10/955,942.
U.S. Office Action dated Sep. 26, 2007 cited in U.S. Appl. No. 11/151,686.
U.S. Office Action dated Oct. 9, 2007 cited in U.S. Appl. No. 10/982,073.
U.S. Final Office Action dated Apr. 29, 2008 cited in U.S. Appl. No. 10/955,941.
Habraken, Microsoft Office XP 8 in 1, published Jun. 5, 2001, http://proquest.safaribooksonline.com/0789725096/, 12 pgs.
Word 2002, Chapter 14; Paradigm Publishing Inc., copyright 2002; http://www.emcp.com/tech_tutorials/sig_irc/Signature_Word_Chapter_14.ppt, 21 pgs.
Chilean Office Action dated Mar. 28, 2008 cited in Application No. 1770-05, no English Translation.
U.S. Final Office Action dated Dec. 21, 2007 cited in U.S. Appl. No. 10/851,506.
U.S. Final Office Action dated Dec. 28, 2007 cited in U.S. Appl. No. 10/800,056.
U.S. Final Office Action dated Jan. 8, 2008 cited in U.S. Appl. No. 10/955,928.
U.S. Office Action dated Jan. 28, 2008 cited in U.S. Appl. No. 10/836,154.
U.S. Appl. No. 12/028,797, filed Feb. 9, 2008 entitled "Side-by-Side Shared Calendars".
U.S. Office Action dated Feb. 20, 2008 cited in U.S. Appl. No. 10/848,774.
U.S. Office Action dated Feb. 21, 2008 cited in U.S. Appl. No. 10/851,442.
Marshall School of Business, Workshop 1—Introduction to Outlook & E-mail, Apr. 6, 2000, pp. 1-11.
Jane Dorothy Calabria Burke, Ten Minute Guide to Lotus Notes 4.6, Publication dated: Dec. 23, 1997, 2 pgs.
Bill Dyszel, Microsoft Outlook 2000 for Windows for Dummies, Copyright 1999, pp. 82-86, 102-103, 141, 143.
Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.
U.S. Final Office Action dated Apr. 15, 2008 cited in U.S. Appl. No. 10/955,942.
Screendumps Microsoft Corporation, Microsoft Office Professional Edition 2003, 5 pgs.
U.S. Final Office Action dated Apr. 16, 2008 cited in U.S. Appl. No. 10/955,967.
Screendumps Microsoft Corporation, Microsoft Office Professional Edition 2003, 4 pgs.
U.S. Final Office Action dated May 28, 2008 cited in U.S. Appl. No. 10/982,073.
Chinese Official Action dated Mar. 21, 2008 cited in Chinese Application No. 200510092146.4.
Chinese Official Action dated Mar. 21, 2008 cited in Chinese Application No. 200510092139.4.
Philippine Official Action dated Apr. 21, 2008 cited in Philippine Application No. 1-2005-000405.
Philippine Official Action dated Apr. 21, 2008 cited in Philippine Application No. 1-2005-000406.
Office Action mailed Jul. 13, 2007 in U.S. Appl. No. 10/800,056.
Office Action mailed Mar. 12, 2004 in U.S. Appl. No. 10/800,056.
Chinese First Office Action dated Apr. 11, 2008 cited in Application No. 200510092141.1.
Chinese Office Action dated May 23, 2008 cited in Application No. 200510089514.X.
Philippine Official Action dated Jul. 31, 2008 cited in Philippine Application No. 12005000495.
European Communication dated Jun. 23, 2008 cited in European Application No. 04102463.9 2211/1517239.
Philippines Examiner's Action dated Sep. 12, 2008 cited in Application No. 1200500406.
Microsoft Office 11 Beta Layperson's Specification, Copyright 2002, Microsoft Corporation, 28 pgs.
FrontPage 11 Beta Layperson's Specification, Copyright 2002, Microsoft Corporation, 12 pgs.
Office 11 Beta Letter, Copyright 2002, Microsoft Corporation, 6 pgs.
Microsoft XDocs Beta Layperson Specification, Copyright 2002, Microsoft Corporation, 3 pgs.
Microsoft Publisher 11 Beta Layperson's Specification, Copyright 2002, Microsoft Corporation, 13 pgs.
Philippines Examiner's Action dated Aug. 19, 2008 cited in Application No. 1-2005-000405.
Chinese Second Office Action dated Oct. 10, 2008 cited in Application No. 200510092141.1.
Chinese Second Office Action dated Oct. 17, 2008 cited in Application No. 200510092139.4.
U.S. Final Office Action dated Oct. 28, 2008 cited in U.S. Appl. No. 11/151,686.
U.S. Office Action dated Nov. 25, 2008 cited in U.S. Appl. No. 11/154,278.
U.S. Office Action dated Dec. 11, 2008 cited in U.S. Appl. No. 10/982,073.
Microsoft Office 2003, Microsoft Office Professional Edition 2003, Microsoft Corporation, 10 pages.
Screendumps—Microsoft Office, Microsoft Office Professional Edition 2003, Microsoft Corporation, 10 pages.
Screendumps—Microsoft Office Outlook, Microsoft Office Outlook Professional Edition 2003, Microsoft Corporation, 2 pages.
Chinese Second Office Action dated Nov. 21, 2008 cited in Appln No. 200510089514.X.
U.S. Official Action dated Jun. 19, 2008 cited in U.S. Appl. No. 10/851,506.
U.S. Official Action dated Jun. 20, 2008 cited in U.S. Appl. No. 10/955,928.
U.S. Official Action dated Dec. 23, 2008 in U.S. Appl. No. 10/955,942.
U.S. Official Action dated Dec. 24, 2008 in U.S. Appl. No. 10/955,967.
U.S. Official Action dated Jan. 6, 2009 in U.S. Appl. No. 10/955,941.
Chilean Office Action dated Nov. 27, 2008 cited in Appln No. 1768-2005.
Chilean Office Action dated Sep. 23, 2008 cited in Appln No. 1770-2005.
Chilean Office Action dated Nov. 27, 2008 cited in Appln No. 1769-2005.
Chinese Office Action dated Apr. 18, 2008 cited in Application No. 200510092142.6.
U.S. Final Office Action dated Jul. 24, 2008 cited in U.S. Appl. No. 11/151,686.
Microsoft Office Word 2003. Part of Microsoft Office Professional Edition 2003. Copyright 1983-2003 Microsoft Corporation.
U.S. Appl. No. 12/372,386, filed Feb. 17, 2009 entitled "Command User Interface for Displaying Multiple Sections of Software Functionality Controls".
Chinese Office Action dated Apr. 3, 2009 cited in Appln No. 200510089514.X.
U.S. Office Action dated Mar. 18, 2009 in U.S. Appl. No. 11/401,470.

Chilean Second Office Action dated Mar. 4, 2009 cited in Appln No. 2512-2005.
U.S. Office Action dated Apr. 28, 2009 in U.S. Appl. No. 12/028,797.
Nielsen, Jacob. "Tabs, Used Right," Alertbox, Sep. 17, 2007, http://www.useit.com/alertbox/tabs.html, 6 pages.
"Managing the Code Editor and View" Microsoft Corporation, http://msdn.microsoft.com/en-us/library/z01zks9a(VS.71).aspx, 2008.
Agarwal, Vikash K., "Creating a Visually Arresting User-Interface: A₃D Tab Control Example," Jan. 4, 2008 http://microsoft.apress.com/asptodayarchive/71723/creating-a-visually-arresting-user-interface-a-3d-tab-control-example, 12 pages.
"Omni Web Help," Omni Group, 2004, http://www.omnigroup.com/documentation/omniweb/browser/tabs.html, 2 pages.
Hepfner, Troy, "New SOCET CXP Interface Improves Usability," Sep. 2008, http://www. socetset.com/gxpmosaic/?p=95, 4 pages.
Chinese Office Action dated Apr. 3, 2009 cited in Appln No. 200510089514.X.
Billo, E. Joseph. "Creating Charts: An Introduction," Excel for Chemists: . A Comprehensive Guide, http://www.ahut.edu.cn/yxsz/ahk/Teaching/Excel%for%20Chemists/ChQ2.pdf, 9 pages.
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf, 7 pages.
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
Lisa K. Averett; Joshua R. Knisley; Mark A. Marvin; Haiti: Projecting Tactical Network and Systems Management; 1995 IEEE pp. 906-910.
Mexican Office Action dated Feb. 5, 2009 cited in Appln No. PA/a/2005/008349.
Mexican Office Action dated Mar. 3, 2009 cited in Appln No. PA/a/2005/008351 English language only.
Chinese Third Office Action dated Jun. 19, 2009 cited in Appln No. 200510092139.4.
Russian Office Action dated Jun. 24, 2009 cited in Appln No. 2005120363/28(023023).
U.S. Official Action dated Feb. 22, 2008 in U.S. Appl. No. 11/445,393.
U.S. Official Action dated Oct. 8, 2008 cited in U.S. Appl. No. 11/445,393.
U.S. Official Action dated Jun. 1, 2009, U.S. Appl. No. 11/445,393.
U.S. Official Action dated Jun. 8, 2009 in U.S. Appl. No. 10/982,073.
U.S. Official Action dated Jun. 10, 2009 in U.S. Appl. No. 11/154,278.
U.S. Official Action dated Jun. 11, 2009 in U.S. Appl. No. 11/151,686.
U.S. Official Action dated Jun. 24, 2009 in U.S. Appl. No. 10/607,020.
"TeeChart for .NET Charting Control," TeeChart for NET Steema Software. http://Iwww.teechart.net.
"Convert to Word 2007," http://www.regencytraining.com/word-2007-conversion.html, Regency Training and Consulting, 2 pages (Date Printed Apr. 21, 2008).
"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).
"Inter-Widget Communication," http://web.mit.edu/6.115/www/miscfiles/amulet/amulet-help/IWC.htm, 6 pages (Feb. 13, 2007).
"The Technology in Document and Check Security," http://www.securedoc.in/thetechnology.htm, 7 pages. (Date Printed Apr. 21, 2008).
Ando, R. et al., "Visualization-enabled multi-document summarization by Iterative Residual Rescaling," Natural Language Engineering, vol. 11, No. 1, pp. 67-86 (Mar. 2005) (2 page Abstract).
Bos, B, "Re: A proposal for addition to HTML 3.0: Frames," http://www.nyct.net/~aray/htmlwg/95q3/1141.html, 5 pages (Sep. 21, 1995).
de Candussio, N., "Common GUI Features Report," Herschel CSDT Meeeting, pp. 1-21 (Sep. 2007).

Krill, P., "Microsoft's Ribbon Interface Draws Frowns, Smiles," InfoWorld, http://www.infoworld.com/article/08/03/04/10NF-microsoft-fluentui_1.html, 3 pages (Mar. 4, 2008).
Rice, F, "Customizing the 2007 Office System Document Inspector," http://msdn2.microsoft.com/en-us/library/aa338203(d=printer).aspx, 10 pages (May 2006).
Boyce, "Microsoft Outlook Inside Out," 2001, pp. 133, 134, 721-728.
Halvorson et al., "Microsoft Office XP Inside Out," 2001, pp. 4, 5, 10, 11, 70-74, 281-288, 1010-1014, 1173-1175.
Pogue, David. "Windows XP Home Edition: The Missing Manual," O'Reilly, 1st Edition, May 1, 2002, pp. 37, 38, 41.
Screendumps—Microsoft Office, Microsoft Corporation, Microsoft Office Professional Edition 2003, 13 pages.
PCT Search Report dated Feb. 6, 2007 cited in International Application No. PCT/US2006/035467.
International Search Report dated Nov. 27, 2007 in PCT/US2007/012573, 9 pages.
Supplementary European Search Report dated May 28, 2009 cited in EP Application No. 07795391.7-1225.
PCT Search Report dated Feb. 6, 2007 cited in International Application No. PCT/US2006/035467.
International Search Report dated Nov. 2007 in PCT/US2007/012573, 9 pages.
European Communication dated Jun. 9, 2009 cited in EP Application No. 07795391.7-1225.
Mexican Office Action dated Jun. 19, 2009 cited in Appln. No. PA/a/2005/007073.
Chinese Office Action dated Jul. 3, 2009 cited in Appln. No. 200680018095.3.
Russian Office Action dated Jul. 21, 2009 cited in Appln No. 2005125837/09(029011).
Russian Office Action dated Jul. 30, 2009 cited in Appln No. 2005125831/09(029005).
European Search Report dated Sep. 7, 2009 cited in EP Application No. 09006972.5-2211.
European Communication dated Sep. 14, 2009 cited in Appln. No. 07795391.7-1225.
U.S. Official Action dated Sep. 6, 2007 in U.S. Appl. No. 11/136,800.
U.S. Official Action dated May 30, 2008 cited in U.S. Appl. No. 11/430,562.
U.S. Official Action dated Jun. 27, 2008 cited in U.S. Appl. No. 11/430,416.
U.S. Official Action dated Jul. 9, 2008 cited in U.S. Appl. No. 11/136,800.
U.S. Official Action dated Aug. 4, 2009 in U.S. Appl. No. 10/955,967.
U.S. Official Action dated Aug. 4, 2009 in U.S. Appl. No. 10/955,942.
U.S. Official Action dated Aug. 18, 2009 in U.S. Appl. No. 11/782,059.
U.S. Official Action dated Sep. 23, 2009 in U.S. Appl. No. 11/401,470.
International Search Report dated Oct. 17, 2007 cited in International Application No. PCT/US2006/012724.
Perronne et al. "Building Java Enterprise Systems with J2EE", Publisher: Sams, Pub Date: Jun. 7, 2000 (pp. 1-8).
Russian Office Action dated Oct. 26, 2009 cited in Appln No. 2005120363/09(023023).
PCT Search Report and Written Opinion dated Dec. 29, 2009 cited in International Application No. PCT/US2009/046344.
U.S. Official Action dated Nov. 13, 2009 in U.S. Appl. No. 11/154,278.
U.S. Official Action dated Dec. 8, 2009 in U.S. Appl. No. 11/151,686.
U.S. Official Action dated Dec. 9, 2009 in U.S. Appl. No. 12/028,797.
U.S. Final Office Action dated Jan. 6, 2010 cited in U.S. Appl. No. 10/607,020.
U.S. Office Action dated Jan. 25, 2010 cited in U.S. Appl. No. 10/982,073.
U.S. Appl. No. 12/769,787, filed Apr. 29, 2010 entitled "Conversation Grouping of Electronic mail Records".
U.S. Appl. No. 12/777,287, filed May 11, 2010 entitled "User Interface for Providing Task Management and Calender Information".
U.S. Appl. No. 11/217,071, filed Aug. 30, 2005 entitled "Markup Based Extensibility for User Interfaces".

Clifton, The Application Automation layer—Using XML to Dynamically Generale GUI Elements—forms and controls, The Code Project, Jun. 2003, pp. 1-37.
Australian Office Action dated May 28, 2010 cited in Appln No. 2005202717.
U.S. Official Action dated Mar. 30, 2010 in U.S. Appl. No. 11/217,071.
U.S. Official Action dated Apr. 15, 2010 in U.S. Appl. No. 11/823,999.
U.S. Official Action dated May 5, 2010 in U.S. Appl. No. 10/851,506.
U.S. Official Action dated May 25, 2010 in U.S. Appl. No. 10/607,020.
U.S. Appl. No. 12/725,605, filed Mar. 17, 2010 entitled "Improved user Interface for Displaying Selectable Software Functionality Controls that are Relevant to a Selected Object".
U.S. Appl. No. 12/753,923, filed Apr. 5, 2010 entitled "Automatic Grouping of Electronic Mail".
Screendumps—Microsoft Office (Microsoft Corporation, Microsoft Office Professional Edition 2003; 16 pages).
Chinese Office Action dated Jan. 22, 2010 cited in Appln No. 200680032564.7.
Chilean Second Office Action dated Jan. 29, 2010 cited in Appln No. 1769-2005.
Chinese Third Office Action dated Feb. 12, 2010 cited in Appln No. 200510092142.6.
Philippines Examiner's Action dated Mar. 11, 2010 cited in Appln. No. 1-2005-000405.
Chinese Office Action dated Mar. 11, 2010 cited in Appln No. 200780020312.7.
Australian Office Action dated Mar. 25, 2010 cited in Appln No. 2005203411.
Australian Office Action dated Mar. 25, 2010 cited in Appln No. 2005203412.
Australian Office Action dated Mar. 26, 2010 cited in Appln No. 2005203409.
Australian Office Action dated Apr. 8, 2010 cited in Appln No. 2005203410.
U.S. Official Action dated Jan. 20, 2010 in U.S. Appl. No. 10/955,967.
U.S. Official Action dated Feb. 18, 2010 in U.S. Appl. No. 11/782,059.
U.S. Official Action dated Feb. 19, 2010 in U.S. Appl. No. 10/955,942.
U.S. Official Action dated Feb. 22, 2010 in U.S. Appl. No. 11/401,470.
Halvorson et al., Microsoft Office Professional Official Manual, Aug. 20, 2002, 10 pgs.
Chinese Second Office Action dated Jul. 6, 2010 cited in Appln No. 200680033212.3.
Mexican Office Action dated Aug. 12, 2010 cited in Appln No. 2005/008354.
U.S. Official Action dated Aug. 2, 2010 in U.S. Appl. No. 10/955,942.
U.S. Official Action dated Aug. 6, 2010 in U.S. Appl. No. 11/401,470.
Mexican Office Action dated May 4, 2010 cited in Appln No. 2005/008354.
U.S. Official Action dated Sep. 21, 2010 in U.S. Appl. No. 11/217,071.
U.S. Official Action dated Sep. 27, 2010 in U.S. Appl. No. 10/836,154.
U.S. Official Action dated Jun. 3, 2010 in U.S. Appl. No. 12/028,797.
U.S. Official Acton dated Jun. 22, 2010 in U.S. Appl. No. 11/430,562.
U.S. Official Action dated Jul. 1, 2010 in U.S. Appl. No. 11/782,059.
U.S. Official Action dated Jul. 6, 2010 in U.S. Appl. No. 10/955,967.
ScreenShot of MS_Office_2003; (Microsoft Corporation, Microsoft Office Professional Edition 2003; 6 pages).
Israeli Office Action dated Oct. 28, 2010 cited in Appln No. 169716.
U.S. Official Action dated Dec. 8, 2010 in U.S. Appl. No. 10/851,506.
U.S. Official Action dated Dec. 8, 2010 in U.S. Appl. No. 10/955,967.
U.S. Official Action dated Dec. 16, 2010 in U.S. Appl. No. 11/430,562.
U.S. Official Action dated Dec. 20, 2010 in U.S. Appl. No. 11/445,393.
U.S. Official Action dated Dec. 20, 2010 in U.S. Appl. No. 12/574,256.
U.S. Official Action dated Dec. 29, 2010 in U.S. Appl. No. 12/028,787.
U.S. Official Action dated Jan. 5, 2011 in U.S. Appl. No. 11/823,999.
Padwick, Gordon "Using Microsoft Outlook 2000," 1999 Que Publishing, pp. 530-533.
Slovak, Ken. "Absolute Beginner's Guide to Microsoft Office Outlook 2003." 2003, Que Publishing, pp. 237-241.
Microsoft Press, Microsoft Computer Dictionary, Microsoft Press, Fifth Edition, 2002, pp. 374, 382.
Riggsby, McCoy, Haberman and Falciani, "Mastering Lotus Notes and Domino 6." 2003, pp. 18, 22, 33-35, 47, 122, 123, 215-241, 378.
"About Google Desktop Search", http://www.desktop.google.com/about.html, Oct. 15, 2004, 8 pages.
Find any file or email on your PC as fast as you can type!, http://www.xl.com, 2003, 1 page.
"Lookout", http://www.lookoutsoft.com, Apr. 22, 2005, 20 pages.
"Yahoo to test desktop search", http://news.com.com/yahoo+to+test+desktop+searcach/2100-1032_3-5486381.html, Dec. 9, 2004, 6 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Windows Desktop Search". Http://kunal.kundale.net/reviews/wds.html, Jul. 10, 2005, 7 pages.
"Microsoft Enters Desktop Search Fray", http://www.internetnews.com/ent-news/article.php/3447331, Dec. 13, 2004, 5 pages.
NZ Application No. 541301, Examination Report dated Jul. 25, 2005.
NZ Application No. 541299, Examination Report dated Jul. 25, 2005.
PCT Written Opinion and Search Report dated Jan. 9, 2007 cited in International Application No. PCT/US2006/033809.
European Search Report dated Nov. 25, 2008 cited in Application EP 06 79 0087.
European Office Action mailed Mar. 9, 2009, cited in Appln No. 06790087.8.
Russian Office Action dated Oct. 30, 2009 cited in Appln No. 2005125837/09(029011).
Chilean Second Office Action dated Nov. 4, 2009 cited in Appln No. 1770-2005.
Chinese Office Action dated Nov. 27, 2009 cited in Appln No. 200680033212.3.
PCT Search Report and Written Opinion dated Nov. 30, 2009 cited in International Application No. PCT/US2009/046341.
Chilean Second Office Action dated Dec. 4, 2009 cited in Appln No. 1768-2005.
Russian Office Action dated Dec. 28, 2009 cited in Appln No. 2005125836/09(029010).
Israeli Office Action dated Jul. 5, 2010 cited in Appln No. 169718.
PCT Written Opinion and Search Report dated Sep. 2, 2010 cited in International Application No. PCT/US2010/021888.
Malaysian Substantive Examination Adverse Report dated Sep. 30, 2010 cited in Appln No. PI 20052959.
Australian Office Action dated Oct. 21, 2010 cited in Appln No. 2006284908.
Chinese Second Office Action dated Oct. 29, 2010 cited in Appln No. 200680030421.2.
U.S. Official Acton dated Nov. 13, 2008 in U.S. Appl. No. 11/430,562.
U.S. Official Action dated Jan. 9, 2009 in U.S. Appl. No. 11/430,561.
U.S. Official Acton dated Jun. 19, 2009 in U.S. Appl. No. 11/430,562.
U.S. Official Action dated Aug. 17, 2009 in U.S. Appl. No. 11/430,561.
U.S. Official Action dated Sep. 15, 2009 in U.S. Appl. No. 11/217,071.
U.S. Official Acton dated Jan. 7, 2010 in U.S. Appl. No. 11/430,562.
U.S. Appl. No. 12/954,952, filed Sep. 29, 2010 entitled "Gallery User Interface Controls".
Bellavista et al., "A Mobile Infrastructure for Terminal User, and Resource Mobility", Network Operations and Management Symposium, NOMS 2000, pp. 877-890, IEEE/IFIP.

"Microsoft Office Professional Plus 2007", © 2006, Microsoft Corporation; 66 pgs.
U.S. Official Action dated Nov. 9, 2010 in U.S. Appl. No. 10/607,020.
U.S. Official Action dated Nov. 22, 2010 in U.S. Appl. No. 11/782,059.
U.S. Official Action dated Nov. 26, 2010 in U.S. Appl. No. 12/753,923.
Berliner E.M. et al., "Microsoft Office 2003", Feb. 24, 2004, pp. 39-40, 120-124, 175-177, 233-234 [D1].
Berliner E.M. et al., "Microsoft Office 2003", Feb. 24, 2004, p. 173-178 [D2].
Israeli Office Action dated Sep. 6, 2009 cited in Appln No. 169716.
Israeli Office Action dated Sep. 7, 2009 cited in Appln No. 169718.
Russian Office Action dated Sep. 10, 2009 cited in Appln No. 2005125836/09(029010).
Russian Office Action dated Sep. 10, 2009 cited in Appln No. 2005125839/09(029013).
European Communication dated Sep. 28, 2009 cited in Appln No. 09006972.5-2211.
Chinese Office Action dated Oct. 16, 2009 cited in Appln No. 200510092142.6.
U.S. Official Action dated Nov. 24, 2009 in U.S. Appl. No. 11/445,393.
U.S. Appl. No. 13/027,289 filed Feb. 15, 2011 entitled "Floating Command Object".
Notice on Reexamination dated Jan. 21, 2011 cited in Appln No. 200510089514.X.
Chinese Third Office Action dated Feb. 10, 2011 cited in Appln No. 200680033212.3.
U.S. Official Action dated Feb. 11, 2011 in U.S. Appl. No. 11/401,470.
Adler, "Emerging Standards for Component Software," Cybersquare, 1995 IEEE, 10 pgs.
Chamberland, et al., "IBM VisualAge for Java," vol. 37, No. 3, 1998, 26 pgs., http://researchweb.watson.ibm.com/journal/sj/373/chamberland.html [Accessed Feb. 6, 2007].
Zykov, "ConceptModeller: A Problem-Oriented Visual SDK for Globally Distributed Enterprise Systems." Proceedings of the 7th International Workshop on Computer Science and Information Technologies, CSIT 2005, 4 pgs.
"Create Office add-ins: ribbons, toolbars, taskpanes, menus etc.", http://www.add-in-express.com/creating-addins-blog/feed/, Jul. 4, 2007.
"RibbonX API: Extend the 2007 Office System with Your Own Ribbon Tabs and Controls", 2007, Microsoft Corporation, http://msdn.microsoft.com/msdnmag/issues/07/02RibbonX/de-fault.aspx.
"What's New in Excel 2007", Feb. 26, 2007.
Whitechapel et al., "Microsoft Visual Studio 2005 Tools for the 2007 Microsoft Office", Sep. 2006, http://72.14.235.104/search?q=cache:kXdufDB6o-wJ:download.microsoft.com/download/3/2/d/32db7049-bc04-4c79-a91b-7f62eaae754a/VSTO2005SE_Tutorial.doc+This+tutorial+focuses+on+the+new+features+introduced+in+VSTO+2005_SE&hl=en&ct=clnk&cd=3&gl=in.
"The New "Office 2007" User Interface", Microsoft Corporation © 2005, 32 pgs.
"The New Look in Office 12 / Office 2007", Office Watch, posted Sep. 20, 2005, 9 pgs.
Atwood, "Sometime a Word is Worth a Thousand Icons", Coding Horror, Feb. 22, 2006, 9 pgs.
PCT Written Opinion and Search Report dated Nov. 29, 2010 cited in International Application No. PCT/US2010/034277.
Egypt Official Decision dated Mar. 14, 2011 cited in Appln No. 2005080371.
Malaysian Substantive Examination Adverse Report dated Mar. 15, 2011 cited in Appln No. PI 20053260.
2nd Notice on Reexamination dated Mar. 25, 2011 cited in Appln No. 200510089514.X.
Philippines Examiner's Action dated Apr. 12, 2011 cited in Appln No. 1-2005-00404.
U.S. Official Action dated Mar. 14, 2011 in U.S. Appl. No. 12/163,784.
U.S. Official Action dated Apr. 21, 2011 in U.S. Appl. No. 11/445,393.
U.S. Official Action dated Apr. 21, 2011 in U.S. Appl. No. 12/574,256.
U.S. Appl. No. 13/102,633 filed May 6, 2011 entitled "Markup Based Extensibility for User Interfaces".
Philippines Examiner's Action dated Apr. 12, 2011 cited in Appln No. 1-2005-00404.
Japanese Notice of Rejection dated May 6, 2011 cited in Appln. No. 2005-236089.
Japanese Notice of Rejection dated May 6, 2011 cited in Appln. No. 2005-236087.
Chinese Second Office Action dated May 19, 2011 cited in Appln No. 200780020312.7.
U.S. Official Action dated May 5, 2011 in U.S. Appl. No. 10/836,154.
U.S. Official Action dated May 12, 2011 in U.S. Appl. No. 12/753,923.
U.S. Official Action dated May 19, 2011 in U.S. Appl. No. 11/430,562.
U.S. Official Action dated May 19, 2011 in U.S. Appl. No. 10/851,506.
Seo et al, "Hangul Office 2000 Tutoring Book", Sep. 15, 2000, 16 pgs. (Cited in Korean Notice of Rejection May 17, 2011).
Office 2007, Microsoft, Released on Nov. 6, 2006, 23 pgs. (Cited in Jun. 9, 2011 OA).
Mexican Office Action dated Mar. 31, 2011 cited in Appln No. PA/a/2005/008351.
Mexican Office Action dated Mar. 31, 2011 cited in Appln No. PA/a/2005/008349.
Mexican Office Action dated Mar. 31, 2011 cited in Appln No. PA/a/2005/008350.
Korean Notice of Rejection dated May 17, 2011 cited in Appln No. 10-2004-48176.
Russian Office Action dated Jun. 14, 2011 cited in Appln No. 2008147090.
U.S. Official Action dated Jun. 9, 2011 in U.S. Appl. No. 12/464,584.
The Discussion Board Component of Blackboard: An Instructor's Guide; Aug. 2004; 23 pgs. (cited in Jan. 6, 2011 OA).
Hock, "Yahoo! To the Max"; May 10, 2005; 5 excerpted pgs. (cited in Jan. 6, 2011 OA).
Homeworking Forum; archived Dec. 6, 2004; 11 pgs. (Cited in Jun. 7, 2011 OA).
Gina Danielle Venolia et al., Supporting Email Workflow, revised Dec. 2001; 11 pgs. (cited in OA Jan. 6, 2011).
Mock et al., "An Experimental Framework for Email Categorization and Management", Sep. 9-12, 2001, 3 pgs. (Search Rpt).
Yang, "Email Categorization Using Fast Machine Learning Algorithms", 2002, 8 pgs. (Search Rpt).
Islam et al., "Email Categorization Using Multi Stage Classification Technique", 2007, 3 pgs. (Search Rpt).
"Look and Layout", retrieved at <<http://liv.ac.uk/csd/email/outlook/layout.htm>>, University of Liverpool, 9 pgs. (Search Rpt).
"Preview Pane in Conversation: 4 pane view", 2005, Zinbra Inc., 3 pgs. (Search Rpt).
"Reading Pane in Conversation View", retrieved at <<http://www.zimbra.com/forums/users/5918-reading-pane-conversation-view.html>>, 5 pgs. (Search Rpt).
New Zealand Office Action dated Oct. 15, 2009 cited in NZ Application No. 566363.
European Office Action dated Jun. 15, 2010 cited in EP Application No. 06814358.5.
Russian Office Action dated Jul. 26, 2010 cited in RU Application No. 2008109034, w/translation.
Chinese Office Action dated Nov. 11, 2010 cited in CN Application No. 200680032789.2, w/translation.
Russian Office Action dated Nov. 12, 2010 cited in Application No. 2008109034, w/translation.
Mexican Office Action dated Jan. 6, 2011 cited in Appln No. PA/a/2005/008354.
Australian OA dated Jan. 17, 2011 cited in Application No. 2006287408.
Chinese Second Office Action dated Apr. 7, 2011 cited in Application No. 200680032789.2, w/translation.
Japanese Office Action dated Jun. 10, 2011 cited in JP Application No. 2008-530229, w/translation.

Chinese Third Office Action dated Jun. 21, 2011 cited in Appln No. 200680030421.2.
U.S. Official Action dated Oct. 5, 2009 in U.S. Appl. No. 11/332,822.
U.S. Official Action dated Apr. 23, 2010 in U.S. Appl. No. 12/144,642.
U.S. Official Action dated Jun. 25, 2010 in U.S. Appl. No. 11/332,822.
U.S. Official Action dated Sep. 16, 2010 in U.S. Appl. No. 12/144,642.
U.S. Official Action dated Jan. 6, 2011 in U.S. Appl. No. 12/142,927.
U.S. Official Action dated Feb. 1, 2011 in U.S. Appl. No. 11/332,822.
U.S. Official Action dated Feb. 1, 2011 in U.S. Appl. No. 12/144,642.
U.S. Official Action dated Jun. 7, 2011 in U.S. Appl. No. 11/332,822.
U.S. Official Action dated Jul. 8, 2011 in U.S. Appl. No. 11/401,470.
U.S. Official Action dated Jul. 8, 2011 in U.S. Appl. No. 12/163,784.
Mexican Office Action dated Oct. 3, 2011 cited in Appln. No. MX/a/2008/014849.
U.S. Official Action dated Oct. 25, 2011 in U.S. Appl. No. 12/144,642.
U.S. Official Action dated Nov. 2, 2011 cited in U.S. Appl. No. 10/836,154.
Ohmori, Yasuo et al., "Eigyo Mind—A Sales Support Tool," PFU Tech. Rev., vol. 10, No. 1, pp. 32-38, PFU Limited, May 1, 1999, (cited in Aug. 12, 2011 JP Notice of Rej.).
Chinese Second Office Action dated Jul. 14, 2011 cited in Appln No. 20680018095.3.
Chinese Decision on Rejection dated Jul. 21, 2011 cited in Appln No. 20068032789.2.
Korean Notice of Preliminary Rejection dated Jul. 22, 2011 cited in Appln No. 10-2005-0058160.
Japanese Notice of Rejection dated Aug. 12, 2011 cited in Appln. No. 2005-184990.
Korean Preliminary Rejection dated Aug. 23, 2011 cited in Appln. No. 10-2005-0067236.
Korean Preliminary Rejection dated Aug. 23, 2011 cited in Appln. No. 10-2005-0067411.
Korean Preliminary Rejection dated Aug. 29, 2011 cited in Appln. No. 10-2005-0066460.
Australian Office Action dated Aug. 31, 2011 cited in Appln. No. 2007255043.
3rd Official Notice, Mailing No. 134028, dated Sep. 16, 2001 cited in Appln. No. PH1707009.
4th Official Notice, Mailing No. 134052, dated Sep. 16, 2001 cited in Appln. No. PH1707009.
U.S. Official Action dated Aug. 3, 2011 in U.S. Appl. No. 12/142,927.
U.S. Official Action dated Sep. 13, 2011 in U.S. Appl. No. 12/372,386.
U.S. Official Action dated Sep. 14, 2011 in U.S. Appl. No. 12/163,758.
Dr. Dobb's Journal; "Windows 95 Common Controls"; May 1, 1995; 12 pgs. (cited in Dec. 6, 2011 EP Search Rpt).
Korean Notice of Rejection dated Nov. 3, 2011 cited in Appln No. 10-2005-0067257.
Japanese Notice of Rejection dated Nov. 4, 2011 cited in Appln No. 2008-513476.
Japanese Notice of Rejection dated Nov. 11, 2011 cited in Appln. No. 2008-530229.
Chinese Office Action dated Nov. 18, 2011 cited in Appln. No. 200910148820.4.
Chinese Office Action dated Nov. 29, 2011 cited in Appln. No. 200980124383.0.
Chinese Third Office Action dated Dec. 5, 2011 cited in Appln. No. 200680018095.3.
European Search Report dated Dec. 6, 2011 cited in Appln No. 06803424.8.

* cited by examiner

USER INTERFACE FOR DISPLAYING SELECTABLE SOFTWARE FUNCTIONALITY CONTROLS THAT ARE CONTEXTUALLY RELEVANT TO A SELECTED OBJECT

CROSS-REFERENCE TO RELATED APPLICATIONS

The present application claims priority to U.S. Provisional Application No. 60/601,815, filed Aug. 16, 2004, entitled "Improved User Interfaces for Computer Software Applications."

FIELD OF THE INVENTION

The present invention generally relates to software application user interfaces. More particularly, the present invention relates to an improved user interface for displaying selectable software controls that are contextually relevant to a selected object.

BACKGROUND OF THE INVENTION

With the advent of the computer age, computer and software users have grown accustomed to user-friendly software applications that help them write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects.

To assist users to locate and utilize functionality of a given software application, a user interface containing a plurality of generic functionality controls is typically provided along an upper, lower or side edge of a displayed workspace in which the user may enter, copy, manipulate and format text or data. Such functionality controls often include selectable buttons with such names as "file," "edit," "view," "insert," "format," and the like. Typically, selection of one of these top-level functionality buttons, for example "format," causes a drop-down menu to be deployed to expose one or more selectable functionality controls associated with the top-level functionality, for example "font" under a top-level functionality of "format."

Prior user interface systems provide pop-up menus for displaying a set of selectable functionality controls that would deploy onto a user's display screen adjacent to a selected object (e.g., text selection, data object, picture object, etc.) for allowing the user to apply a selected functionality of a software application to the selected object. Such context menus are typically deployed upon a user action such as right-clicking a mouse when the mouse cursor is focused on the selected object. Unfortunately, prior context menus have been limited to a small set of selectable controls, and it is typically difficult to identify the editing context of the menu (e.g., text selection, picture object, etc.). Moreover, if a given document being edited by a user contains different (and distinctly editable) objects, it is often difficult to switch the context of such a context menu from one editing context to another (e.g., text selection to picture object).

Accordingly, there is a need in the art for an improved user interface for displaying a menu of selectable functionality controls that identifies the context of the object to which the menu is relevant, that contains rich functionality controls for applying contextually relevant functionality to a selected object, and that may be efficiently switched to a different context for applying a different set of functionalities to a different or neighboring editable object. It is with respect to these and other considerations that the present invention has been made.

SUMMARY OF THE INVENTION

Embodiments of the present invention solve the above and other problems by providing an improved user interface for displaying selectable functionality controls that identifies the context of the object to which the user interface is relevant, which contains rich functionality controls for applying contextually relevant functionality to a selected object, and which may be efficiently switched to a different context for applying a different set of functionalities to a different or neighboring editable object. Generally, according to aspects of the present invention, a menu of functionalities is displayed adjacent to a selected object where the menu of functionalities includes functionalities associated with editing the selected object. The context menu includes an identification of the object context and a control for selectively changing the context and associated functionalities of the menu to a different object context for displaying a different set of functionalities associated with the different context.

According to another aspect of the invention, methods and systems provide a user interface that is contextually relevant to an edited object. A plurality of functionalities available from a software application is provided. Upon receiving a selection of an object for editing via the software application, the contextually relevant user interface is displayed adjacent to the selected object. One or more selectable functionality controls representing a subset of the plurality of functionalities is displayed in the user interface, and the subset of the plurality of functionalities comprise one or more of the plurality of functionalities that are at least substantially the most used in editing an object of the same type as the selected object.

According to other aspects of the invention, the one or more selectable functionality controls may be displayed in the user interface hierarchically based on frequency of previous use. A control may be displayed in the user interface for changing a context of the user interface based on an attribute of the object selected for editing. Upon changing a context of the user interface based on an attribute of the object selected for editing, one or more selectable controls representing a second subset of the plurality of functionalities may be displayed in the user interface, and the second subset of the plurality of functionalities may comprise one or more of the plurality of functionalities that are at least substantially the most used in editing a second attribute of the object selected for editing. A control may be displayed in the user interface for causing a display in a second user interface of all selectable controls that may be used for editing the selected object.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to an improved user interface for displaying a menu of selectable functionality controls adjacent to or overlaying a selected document or object that identifies the context of the object to which the selectable functionality controls are relevant, which contains rich functionality controls for applying contextually relevant functionality to the selected object, and which may be efficiently switched to a different context for applying a different set of functionalities to a different or neighboring editable object.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
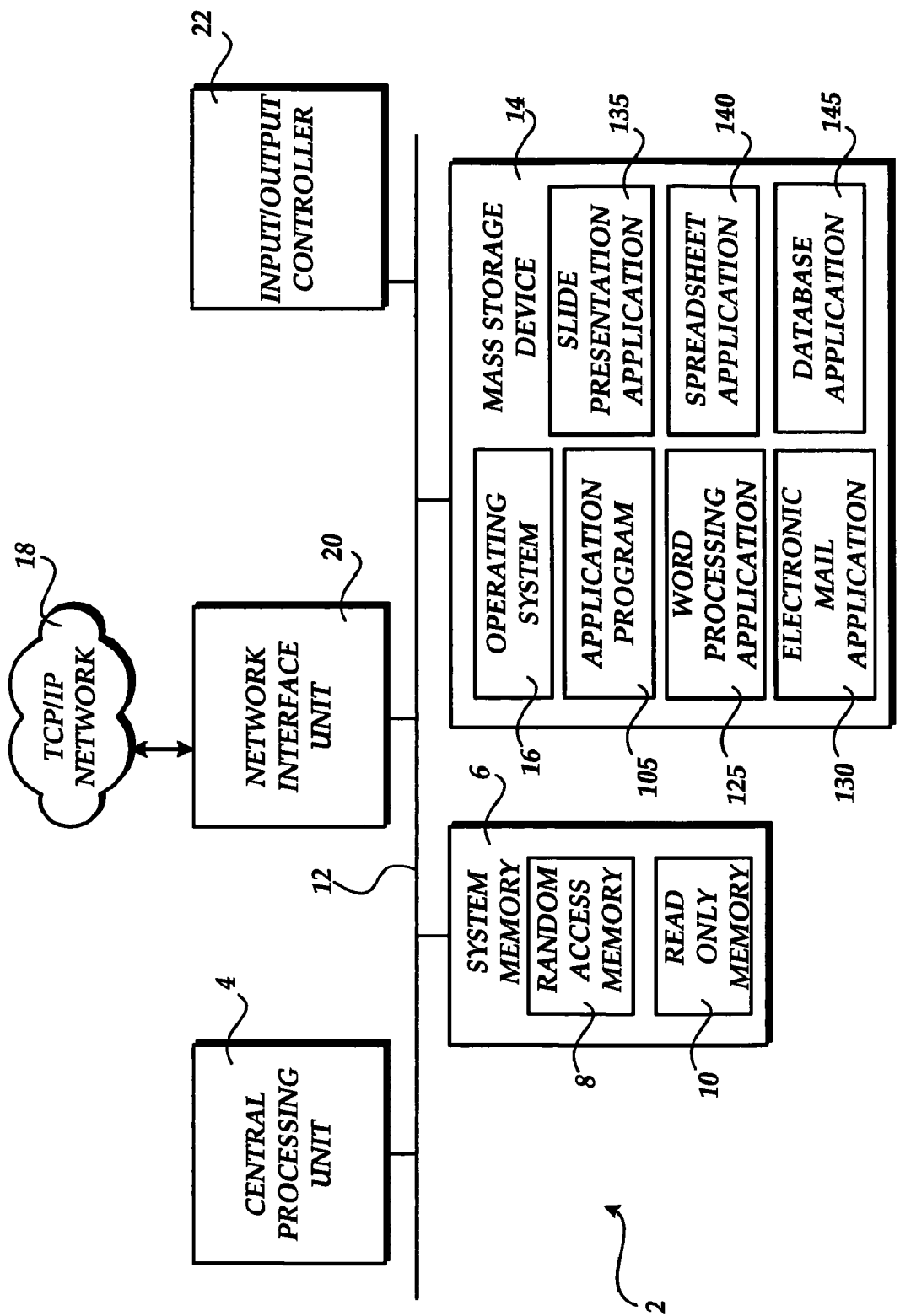
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as an application program 105, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for providing a variety of functionalities to a user. For instance, the application program 105 may comprise many types of programs such as a word processing application, a spreadsheet application, a desktop publishing application, and the like. According to an embodiment of the present invention, the application program 105 comprises a multiple functionality software application for providing word processing functionality, slide presentation functionality, spreadsheet functionality, database functionality and the like. Some of the individual program modules comprising the multiple functionality application 105 include a word processing application 125, a slide presentation application 135, a spreadsheet application 140 and a database application 145. An example of such a multiple functionality application 105 is OFFICE manufactured by Microsoft Corporation. Other software applications illustrated in FIG. 1 include an electronic mail application 130.

Figure 2:
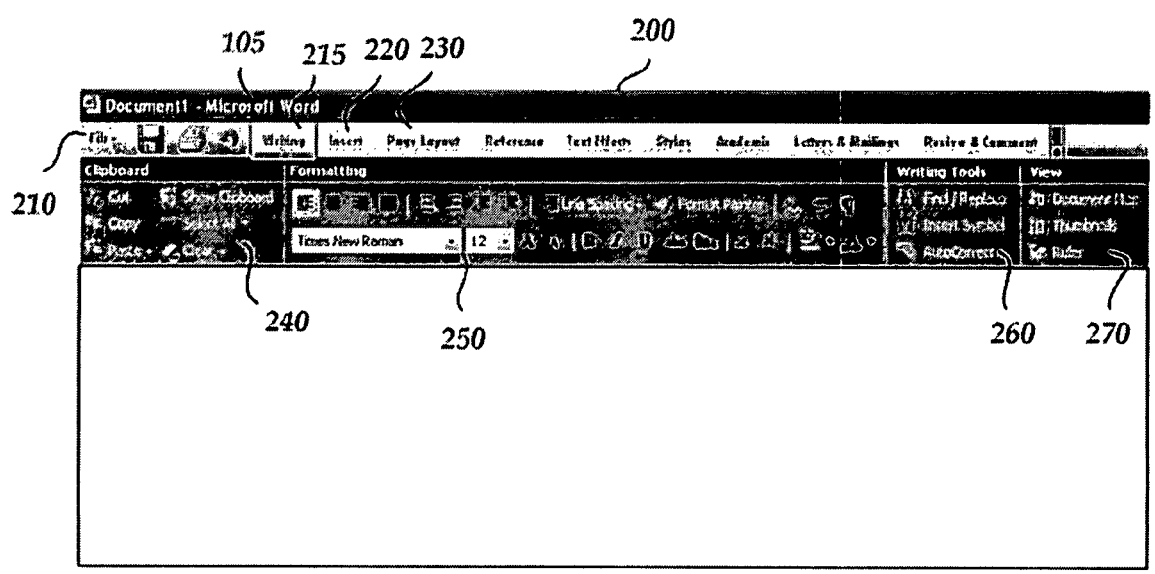
FIG. 2 is an illustration of a computer screen display showing a ribbon-shaped user interface for displaying task-based top-level functionality tabs and for displaying a plurality of functionalities available under a selected top-level functionality tab.

FIG. 2 is an illustration of a computer screen display showing a ribbon-shaped user interface for displaying task-based top-level functionality tabs and for displaying a plurality of functionalities available under a selected top-level functionality tab. As briefly described above, the improved user interface of the present invention includes a ribbon-shaped user interface for displaying selectable controls associated with task-based functionality available under a given software application, such as the software application 105 illustrated in FIG. 1. A first section 210 of the user interface 200 includes generic selectable controls for functionality not associated with a particular task, such as word processing versus spreadsheet data analysis. For example, the section 210 includes selectable controls for general file commands such as "file open," "file save" and "print." According to one embodiment of the present invention, the selectable controls included in the first section 210 are controls that may be utilized by a variety of software applications comprising a multiple functionality application 105. That is, the selectable controls included in the first section 210 may be controls that are generally found and used across a number of different software applications.

Selectable controls included in the first section 210 may be utilized for all such applications comprising such a multiple functionality application, but other selectable controls presented in the user interface 200 described below, may be tailored to particular tasks which may be performed by particular software applications comprising the multiple functionality application. On the other hand, it should be appreciated that the user interface 200 described herein may be utilized for a single software application such as a word processing application 125, a slide presentation application 135, a spreadsheet application 140, a database application 145, or any other software application which may utilize a user interface for allowing users to apply functionality of the associated application.

Referring still to FIG. 2, adjacent to the first section 210 of the user interface 200 is a task-based tab section. The tab section includes selectable tabs associated with task-based functionality provided by a given software application. For purposes of example, the task-based tabs illustrated in FIG. 2 are associated with tasks that may be performed using a word processing application 125. For example, a "Writing" tab 215 is associated with functionality that may be utilized for performing writing tasks. An "Insert" tab 220 is associated with functionality associated with performing insert operations or tasks. A "Page Layout" tab 230 is associated with functionality provided by the associated application for performing or editing page layout attributes of a given document.

As should be appreciated, many other task-based tabs or selectable controls may be added to the tab section of the user interface for calling functionality associated with other tasks. For example, task tabs may be added for text effects, document styles, review and comment, and the like. And, as described above, the user interface 200 may be utilized for a variety of different software applications. For example, if the user interface 200 is utilized for a slide presentation application, tabs contained in the tab section may include such tabs as "Create Slides," "Insert," "Format," "Drawing," "Effects," and the like associated with a variety of tasks that may be performed by a slide presentation application. Similarly, tabs that may be utilized in the tab section of the user interface 200 for a spreadsheet application 140 may include such tabs as "Data" or "Data Entry," "Lists," "Pivot Tables," "Analysis," "Formulas," "Pages and Printing," and the like associated with tasks that may be performed using a spreadsheet application.

Immediately beneath the generic controls section 210 and the task-based tab section is a selectable functionality control section for displaying selectable functionality controls associated with a selected tab 215, 220, 230 from the task-based tab section. According to embodiments of the present invention, when a particular tab, such as the "Writing" tab 215 is selected, selectable functionality available from the associated software application for performing the selected task, for example a writing task, is displayed in logical groupings. For example, referring to FIG. 2, a first logical grouping 240 is displayed under a heading "Clipboard." According to embodiments of the present invention, the clipboard section 240 includes selectable functionality controls logically grouped together and associated with clipboard actions underneath the general task of writing. For example, the clipboard section 240 may include such selectable controls as a cut control, a copy control, a paste control, a select all control, etc. Adjacent to the clipboard section 240, a second logical grouping 250 is presented under the heading "Formatting."

Selectable controls presented in the "Formatting" section 250 may include such selectable controls as text justification, text type, font size, line spacing, boldface, italics, underline, etc. Accordingly, functionalities associated with formatting operations are logically grouped together underneath the overall task of "Writing." A third logical grouping 260 is presented under the heading "Writing Tools." The writing tools section 260 includes such writing tools as find/replace, autocorrect, etc. According to embodiments of the present invention, upon selection of a different task-based tab from the tab section, a different set of selectable functionality controls in different logical groupings is presented in the user interface 200 associated with the selected task-based tab. For example, if the "Insert" task tab 220 is selected, the selectable functionality controls presented in the user interface 200 are changed from those illustrated in FIG. 2 to include selectable functionality controls associated with the insert task. For detailed information regarding the user interface 200, illustrated in FIG. 2, see U.S. patent application Ser. No. 12/372, 386, entitled "Command User Interface for Displaying Selectable Software Functionality Controls," which is incorporated herein by reference as if fully set out herein.

Figure 3:
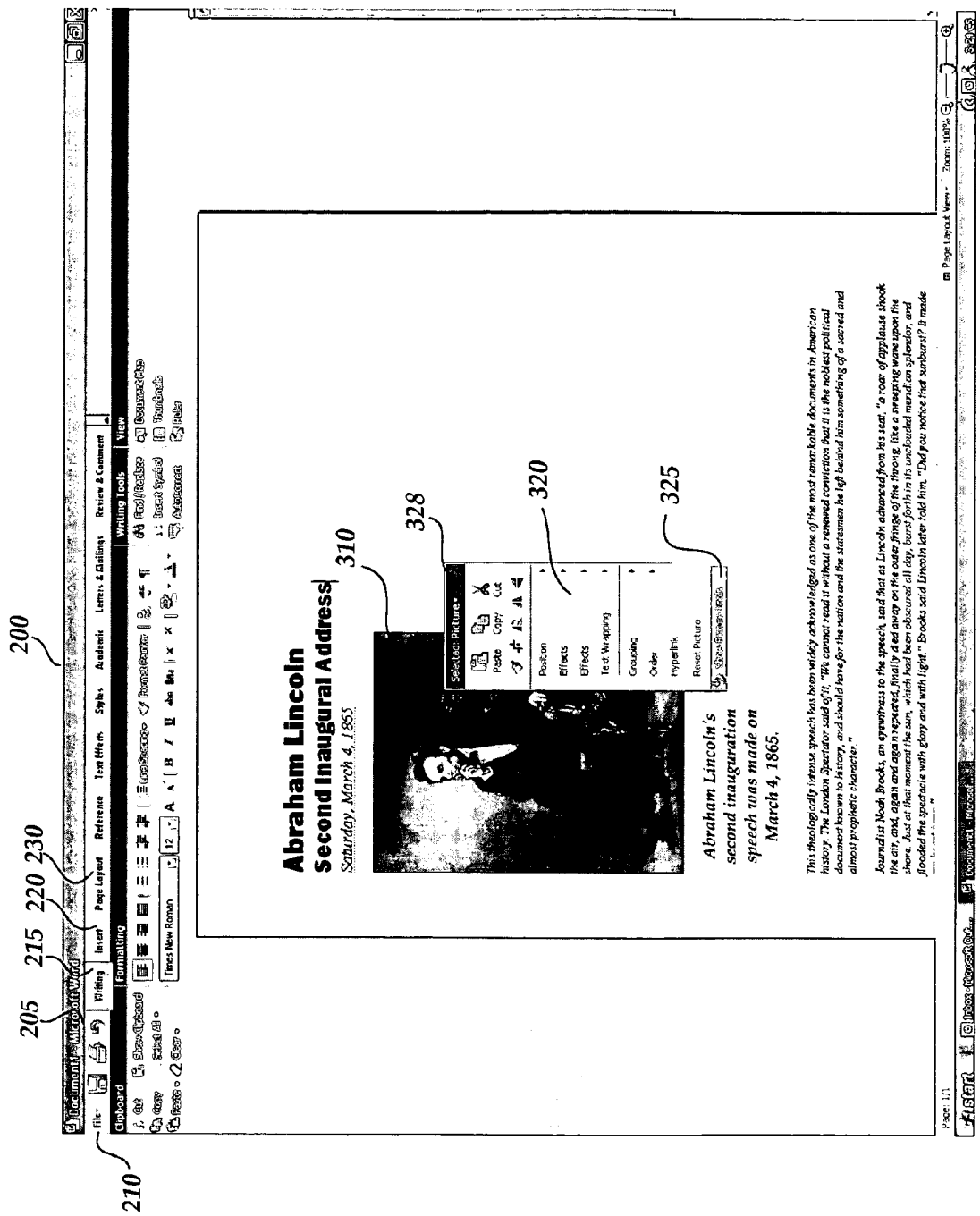
FIG. 3 illustrates a computer screen display showing a context menu according to embodiments of the present invention displayed adjacent to a selected object.

Referring to FIG. 3, an improved context menu according to embodiments of the present invention is illustrated. A document including an embedded picture object 310 is illustrated in a word processing application workspace. According to embodiments of the present invention, the context menu 320 may be launched adjacent to or near a selected object through a variety of methods. One method of launching the context menu 320 is by focusing the mouse cursor on the desired object followed by right-clicking the mouse right-click button. Other methods may be used for launching the context menu 320, including focusing on the selected object for more than a set amount of time, or by selecting a button from the user interface 200 programmed for launching the context menu 320, or by selecting keyboard keys (for example F1) programmed for launching the context menu. The modality of the context menu allows the menu to stay visible while changes are made to an underlying object or to the software application enabling the context menu. That is, display of the context menu of the present invention does not block execution of the application with which an associated object is edited and with which the menu is displayed.

The context menu 320 includes selectable functionality controls that are relevant to editing the selected object in the selected document. That is, the context menu 320 is populated with one or more selectable functionality controls that may be utilized for editing a particular selected object in a selected document. For example, referring to the context menu 320 illustrated in FIG. 3, the context menu is launched in the context of a selected picture object 310. Accordingly, the selectable functionality controls, such as the paste control, copy control, position control, reset picture control, and the like provide functionality to a user for editing attributes of the selected picture object 310. As should be understood by those skilled in the art, if the context menu 320 is launched in the context of another type of object, then the selectable functionality controls populated in the context menu 320 will be related to the other type of object. For example, a context menu 320 launched in the context of a text object will be populated with functionality controls utilized for editing a text selection.

The one or more selectable controls displayed in the context menu represent a subset of a plurality of functionalities available for use with a selected object. According to an embodiment, the subset of functionalities represented by the one or more controls are selected based on likelihood of immediate usefulness to end users based on historical use. The subset of the plurality of functionalities may comprise one or more of the plurality of functionalities that are at least substantially the most used in editing an object of a same type as the selected object. Additionally, the one or more selectable functionality controls may be displayed in the user interface hierarchically based on frequency of previous use or according to other ordering criteria.

According to embodiments of the present invention, the improved context menu 320 includes rich functionality controls such as the paste control, the copy control, the cut control, and the picture orientation controls illustrated in the upper portion of the context menu 320. In addition, a button 325 is illustrated along a bottom edge of the context menu 320 for allowing a user to selectively display an enhanced listing of tools available for editing the selected object. According to one aspect, the button 325 may be colored differently from other controls in the menu 320 to distinguish the button 325 from other controls. As should be understood, the "Show Picture Tools" button 325 is illustrative of a similar button that may be used in other context menus 320 associated with other editing contexts such as text objects, table objects, spreadsheet objects, and the like.

A context identification and selection tab 328 is illustrated along an upper edge of the context menu 320. The context identification and selection tab 328 both identifies the current context of the context menu 320 and allows the user to change the context of the context menu 320 to provide selectable functionality controls associated with a different editing context in the selected document. For example, referring to FIG. 3, the selected document includes both a picture object and a text object. According to the context identification and selection tab 328, the present context of the context menu 320 is a "Picture" context meaning that the selectable functionality controls displayed in the context menu 320 are associated with functionality for editing a selected picture object. If the user desires to change the context of the context menu 320 to a text editing context, for example, the user may select the context identification and selection tab 328 to drop down a list of available contexts that may be applied to the context menu 320. The user may then select a text context to change the context of the context menu 320 so that selectable functionality controls that may be utilized for text editing will be displayed in the context menu 320.

Figure 4:
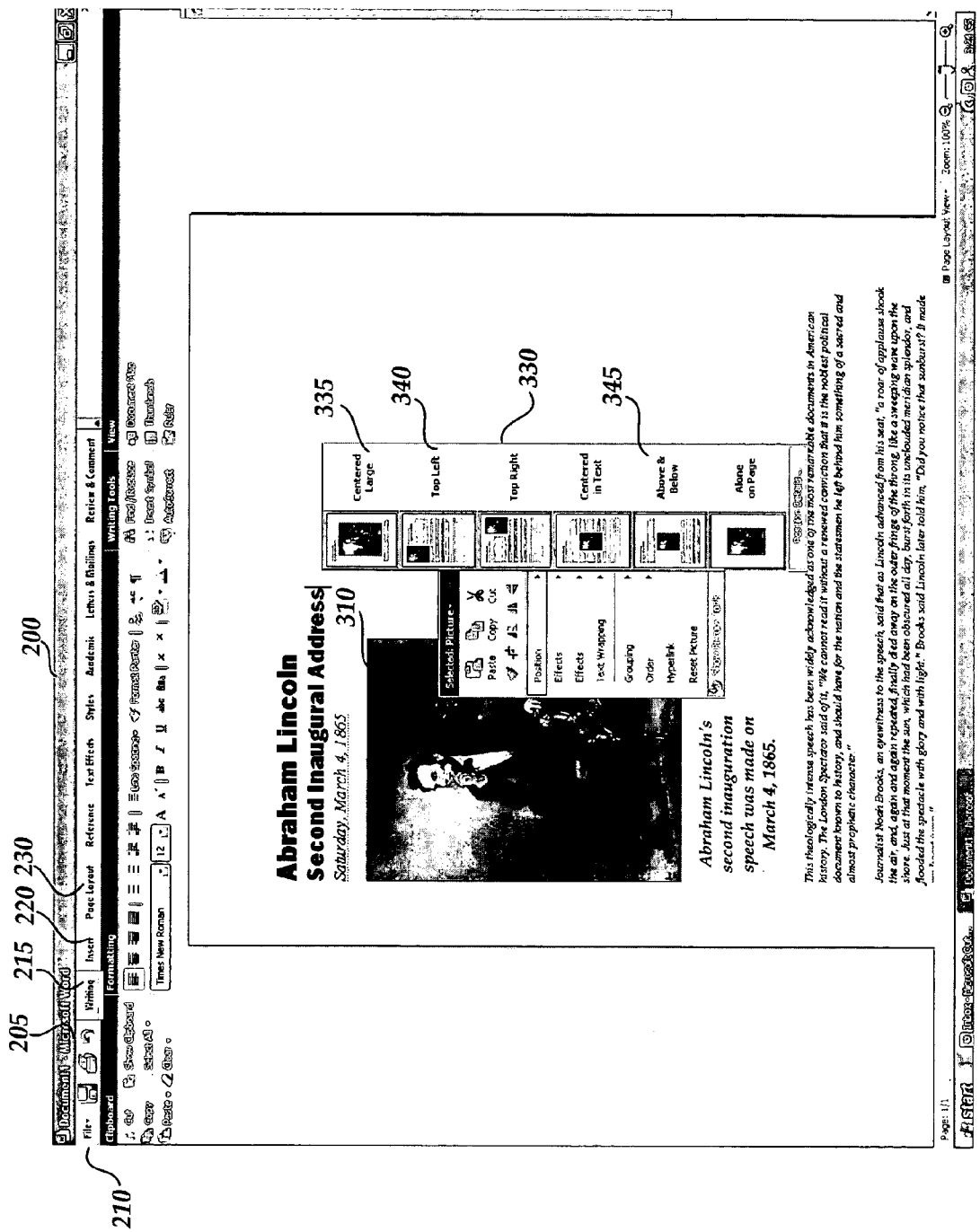
FIG. 4 illustrates the screen display of FIG. 3 showing an expanded version of the context menu for providing a menu of formatting options combinations.

Referring now to FIG. 4, a pop-out visual picker gallery of images is illustrated adjacent to the context menu 320. According to embodiments of the present invention, selection of certain selectable functionality controls results in a pop-out menu, such as the menu 330, for providing additional selectable functionality controls to the user. The visual picker display 330 provides a gallery of images showing the result of applying a variety of formatting options combinations to the selected object. For example, an image 335 illustrates the way the document will look if the picture object 310 is centered and enlarged. The image 340 illustrates how the document will look if the picture object is moved to a top-left position in the document, and the image 345 illustrates how the document will look if text is positioned both above and below a centered picture object 310. According to embodiments of the present invention, all commands necessary for formatting the selected document according to one of the displayed images 335, 340, 345 are associated with the individual images so that selecting a given image automatically causes the formatting options combination illustrated thereby to be executed on the selected document. For detailed information regarding the gallery of images 330, see U.S. patent application Ser. No. 10/955,942, entitled "An Improved User Interface For Displaying A Gallery Of Formatting Options Applicable To A Selected Object," which is incorporated herein by reference as if fully set out herein.

Figure 5:
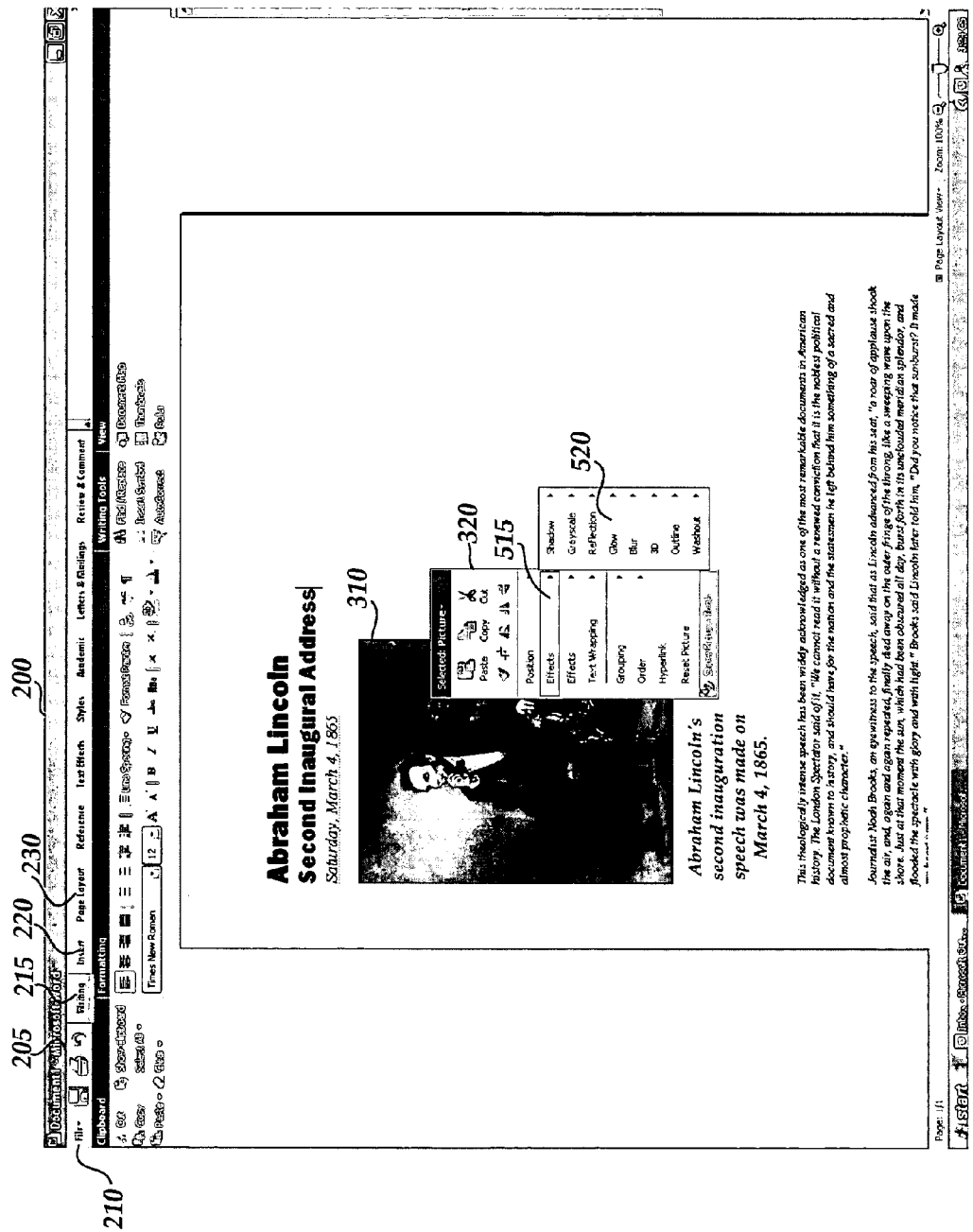
FIG. 5 illustrates the computer screen display of FIG. 3 showing the display of a different set of functionality controls available from the displayed context menu.
Figure 6:
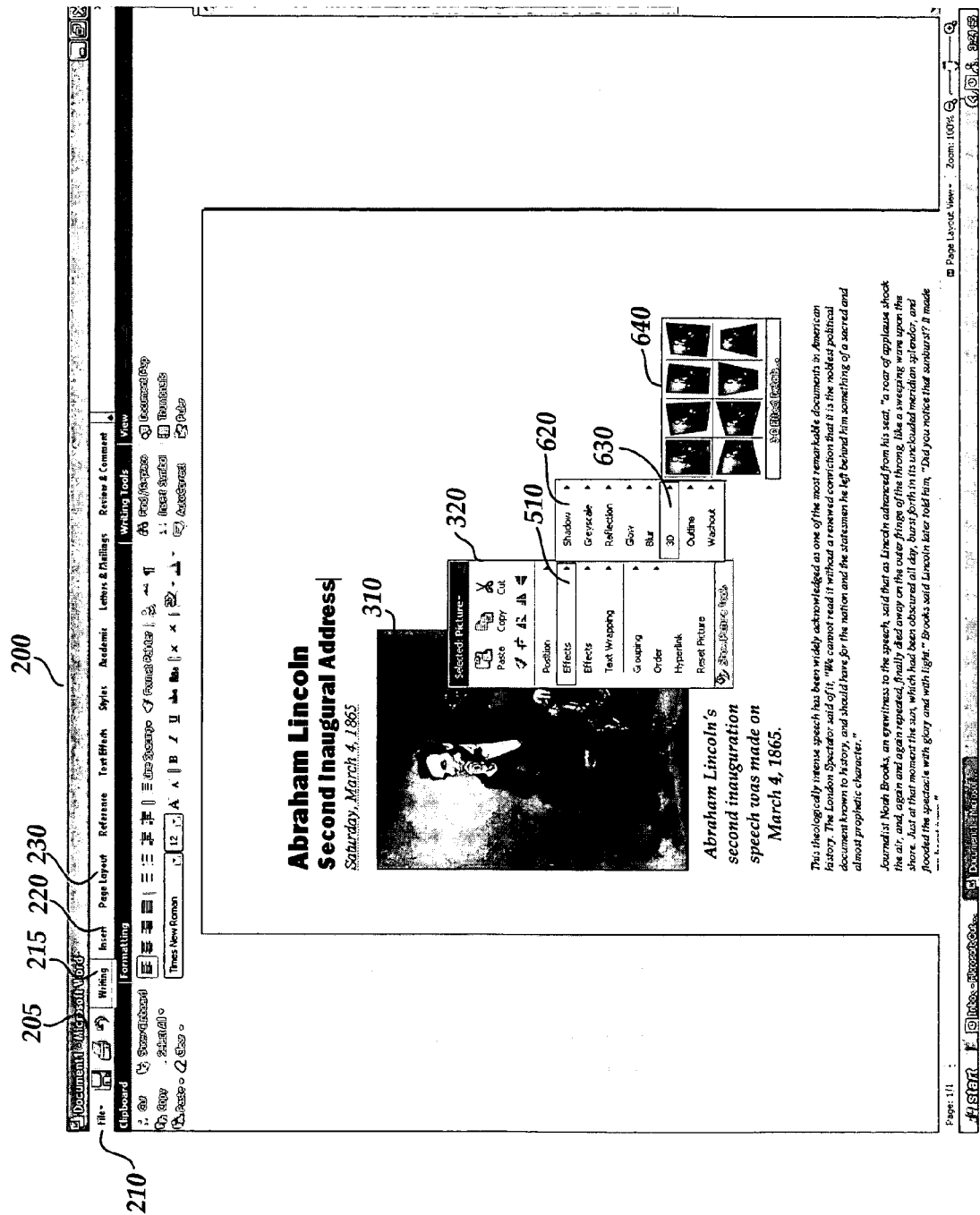
FIG. 6 illustrates the computer screen display of FIG. 5 showing expansion of the displayed context menu to provide a gallery of images associated with different formatting options combinations that may be applied to an associated document object.

Referring now to FIG. 5, presentation of an additional menu of selectable functionality controls is illustrated adjacent to the context menu 320 in response to selecting a functionality control from the context menu 320. As should be appreciated by those skilled in the art, the pop-out menu 520 contains additional selectable functionality controls that may be selected by the user to apply identified functionality to a selected document or object. As shown in FIG. 6, upon selection of a given functionality control from the pop-out menu 620, for example the "3D" functionality control, an additional pop-out menu 640 is provided for displaying additional functionality associated with the selected control from the pop-out menu 620. As illustrated in FIG. 6, the "3D" control 630 is selected, which causes a pop-out gallery of images 640 to be displayed. As described above with reference to FIG. 4, each of the gallery of images 640 illustrates how the selected picture object will look if a formatting options combination associated with a selected image from the gallery of images 640 is applied to the selected object 310.

Figure 7:
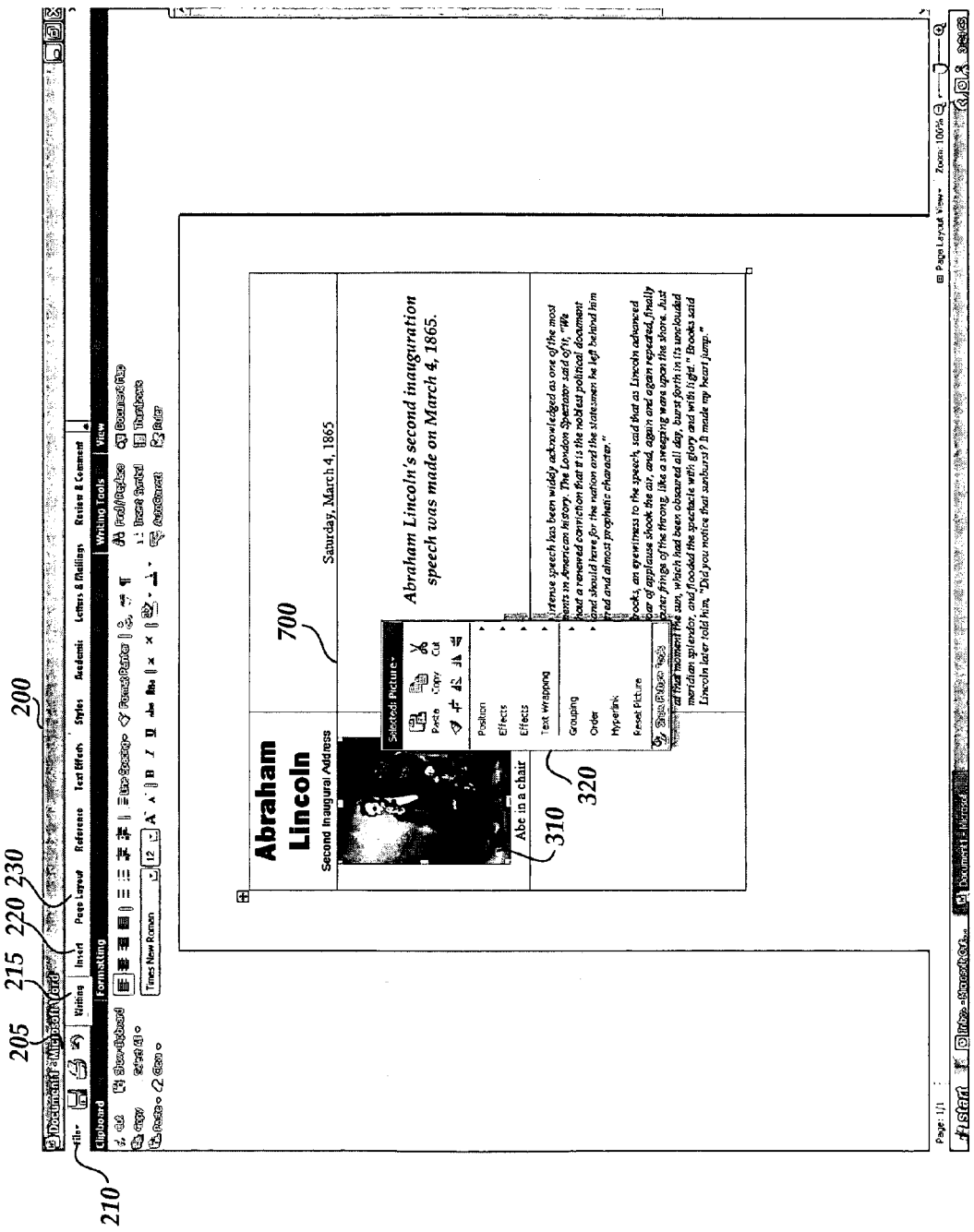
FIG. 7 illustrates a computer screen display showing a context menu according to embodiments of the present invention displayed adjacent to a selected object.
Figure 8:
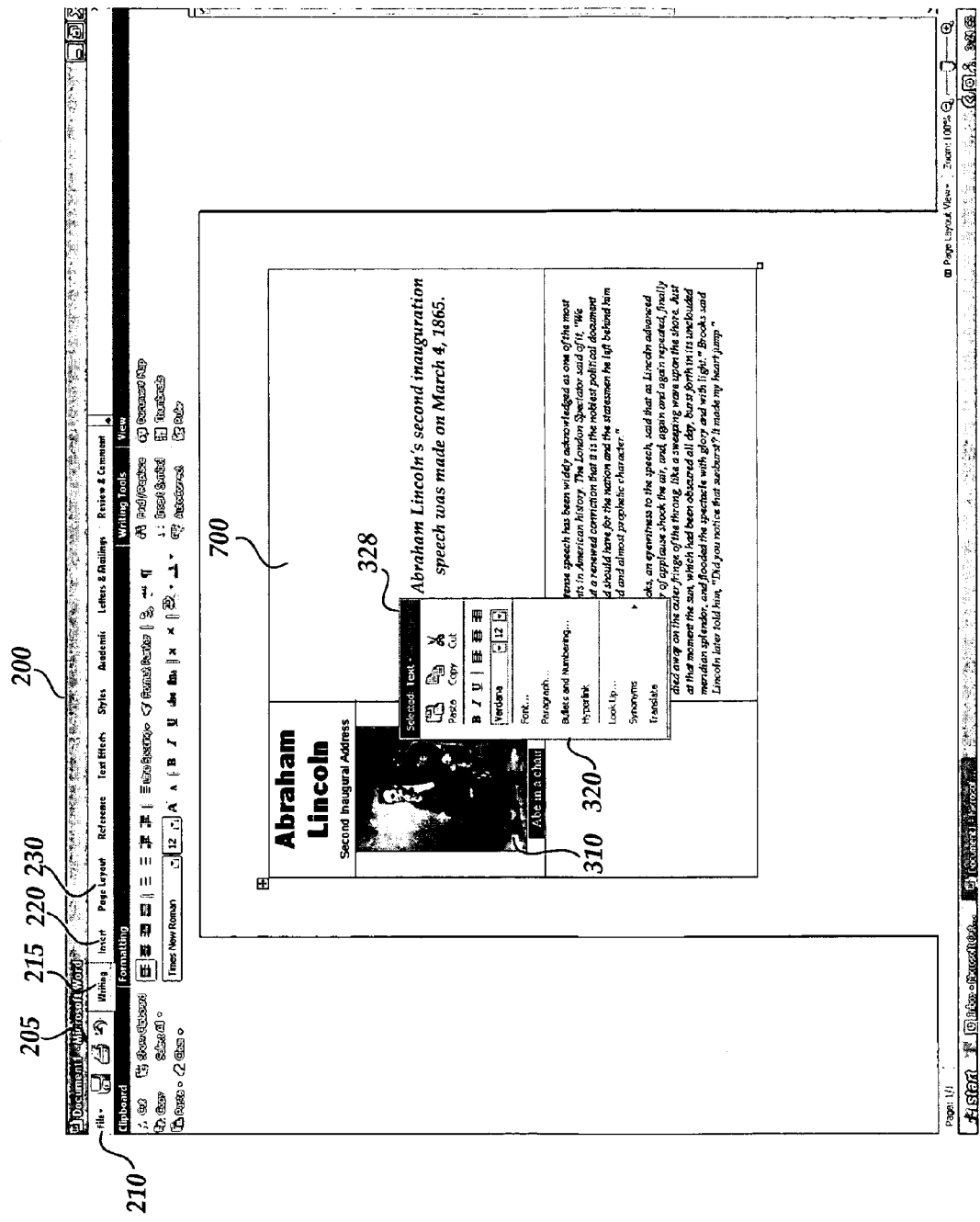
FIG. 8 illustrates the computer screen display of FIG. 7 showing the context menu selectively changed to a different editing context.

Referring now to FIG. 7, the context menu 320 is illustrated adjacent to the selected picture object 310 and over a text object where the picture object 310 and the text object are placed in a table structure. Because the context menu 320 is launched in the context of the selected picture object 310, the context menu 320 is still in a picture context and still has selectable functionality controls relevant to editing a picture object 310. However, referring to FIG. 8, if the user elects to apply functionality from the context menu 320 to the text object contained in the table object 700, the user may change the context of the context menu 320 from a picture context to a text context. By selecting the context identification and selection tab 328, as described above with reference to FIG. 3 and by selecting a text context, the context menu 320 is changed so that the selectable functionality controls displayed in the context menu 320 are in the context of a text selection, as illustrated in FIG. 8. That is, the context menu 320 illustrated in FIG. 8 includes such text oriented selectable functionality controls as font, paragraph, bullets and numbering, boldfacing, italics, underlining, and the like.

Figure 9:
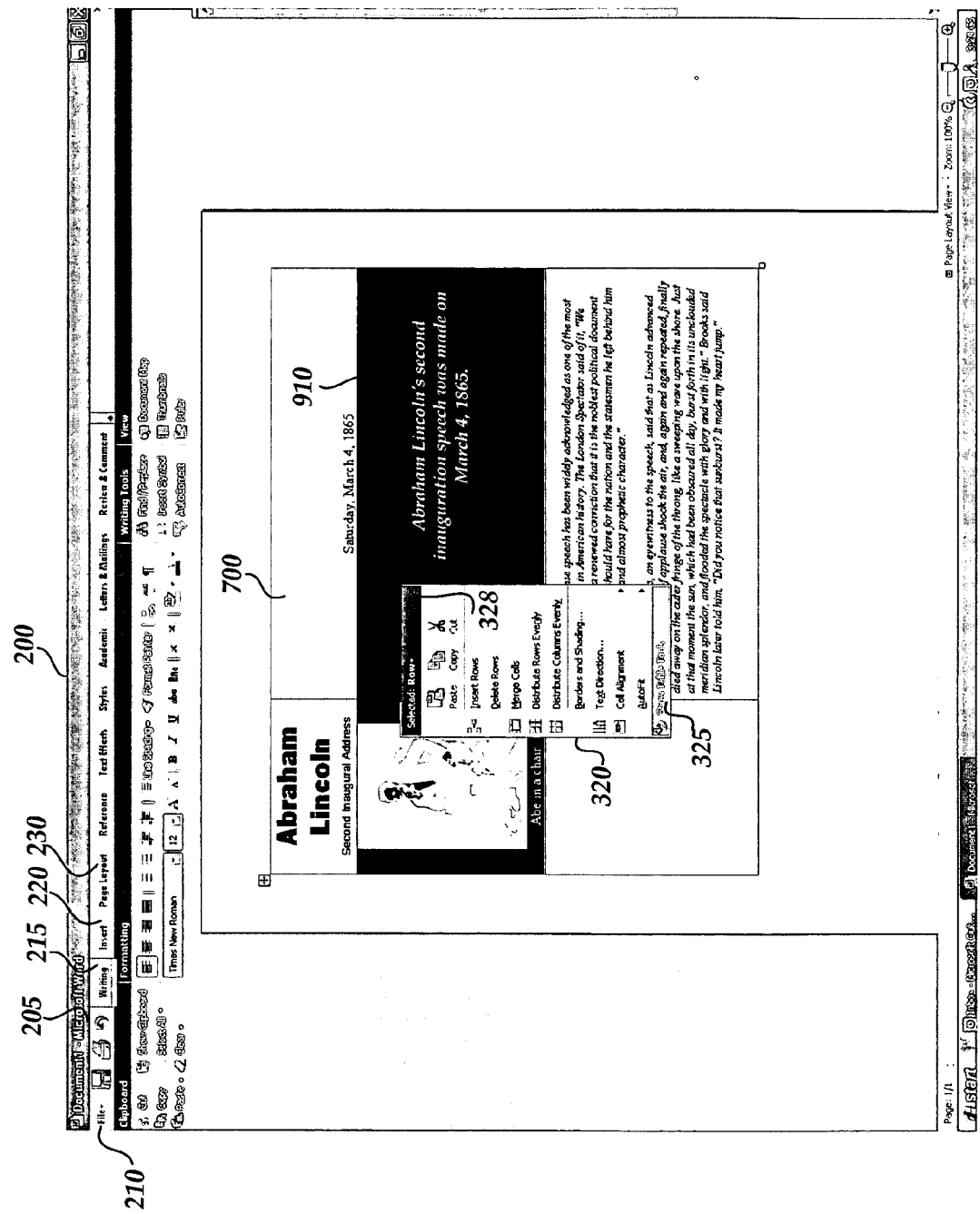
FIG. 9 illustrates the computer screen display of FIG. 7 showing the context menu selectively changed to a different editing context.

Referring now to FIG. 9, if the user now elects to change the context of the context menu 320 once again so that the functionality controls displayed in the context menu 320 are associated with yet another context, for example the table object 700, the user may once again select the context identification and selection tab 328 to change the context of the context menu 320 from a text context illustrated in FIG. 8 to a table or row context illustrated in FIG. 9. Upon changing the context of the context menu 320 to a table or row context for editing a row 910 of the table object 700, the selectable functionality displayed in the context menu 320 is changed as illustrated in FIG. 9. For example, after changing the context of the context menu 320 to a row context, such selectable functionality controls as "Insert Rows," "Delete Rows," "Merge Cells," "Distribute Rows Evenly," and the like are displayed in the context menu 320. As should be understood, the example functionality controls illustrated in the context menus 320 described herein and the example picture and text objects illustrated herein are for purposes of example only and are not restrictive of the invention as claimed herein. That is, the context menu 320 may be displayed according to a variety of different editing contexts, and a variety of different selectable functionality controls may be displayed in the context menu 320 according to the associated editing context.

As described herein, an improved user interface for displaying selectable functionality controls in a context menu is provided. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for providing a contextually relevant user interface, the method comprising:
   upon receiving a selection of a first object for editing within a document, displaying the contextually relevant user interface adjacent to the selected first object;
   displaying, in the user interface, a first context identification control for identifying a first context of the user interface based on at least one first attribute of the selected first object;
   displaying, in the user interface, a second context changing control for changing the first context of the user interface to a second context of the user interface based on at least one second attribute of a second object within the document, the second control being operative to provide a plurality of available contexts simultaneously, each of the plurality of available contexts being associated with an attribute of an unselected object within the document; and
   displaying, in the user interface, at least one selectable control representing a first subset of a plurality of functionalities, wherein the first subset of the plurality of functionalities comprises at least a first functionality that is at least substantially used in editing objects of a same type as the selected first object.

2. The method of claim 1, further comprising displaying the at least one selectable control in the user interface hierarchically based on frequency of previous use.

3. The method of claim 1, further comprising, displaying, in response to a selection of the second control, the second context associated with the selection of the second control, the second context comprising a second subset of the plurality of functionalities, the second subset of the plurality of functionalities comprising functionalities that are at least substantially used in editing objects of a same type as the second object.

4. The method of claim 1, further comprising displaying in the user interface a third control for causing a display, adjacent to the user interface, of a plurality of additional selectable controls operative to edit the selected first object.

5. The method of claim 1, wherein displaying the at least one selectable control comprises displaying the at least one selectable control further representing functionality of the software operative to edit the selected first object.

6. The method of claim 1, wherein displaying, in the user interface, the at least one selectable control representing the subset of a plurality of functionalities comprises displaying, in the user interface the at least one selectable control representing the subset of the plurality of functionalities associated with a picture object.

7. The method of claim 6, wherein the subset of the plurality of functionalities associated with the picture object comprises functionalities associated with at least one of the following: a paste control, a copy control, a position control, and a reset control.

8. The method of claim 1, further comprising providing a gallery of formatting images in response to a selection of the at least one selectable control, the gallery of formatting comprising at least one formatting image associated with at least one corresponding formatting attribute to be applied to the selected first object, wherein the at least one formatting image provides a visual representation of how the selected object would appear if the at least one formatting image is selected and the at least one corresponding formatting attribute is applied to the selected first object, the at least one formatting image comprising a textual identification of the at least one corresponding formatting attribute.

9. The method of claim 8, further comprising applying the at least one corresponding formatting attribute associated with the at least one formatting image to the selected first object in response to a selection of the at least one formatting image.

10. The method of claim 9, wherein providing the gallery of formatting images includes providing the gallery of formatting images within a second user interface deployed adjacent to the contextually relevant user interface.

11. A system for providing an improved contextually relevant user interface, the system comprising:
    a memory storage; and
    a processing unit coupled to the memory storage, wherein the processing unit is operative to:
    upon receiving a selection of a first object for editing within a document, display the contextually relevant user interface adjacent to the selected first object;
    display, in the user interface, a context identification tab having a first context identifying control for identifying a first context of the user interface based on at least one first attribute of the selected first object and changing the first context to a second context of the user interface based on at least one second attribute of a second object within the document, the context identification tab being operative to provide a plurality of available contexts simultaneously which, upon selection of one of the plurality of available contexts, causes a replacement of the first context populating the user interface with the second context, each of the available contexts being associated with an attribute of an unselected object in the document; and display, in the user interface, at least one selectable control representing a subset of a plurality of functionalities, wherein the subset of the plurality of functionalities comprises at least one functionality that is at least substantially used in editing objects of a same type as the selected first object.

12. The system of claim 11, further comprising the processing unit being operative to provide a gallery of formatting images in response to a selection of the at least one selectable control, the gallery of formatting comprising at least one formatting image associated with at least one corresponding formatting attribute to be applied to the selected first object, wherein the at least one formatting image provides a visual representation of how the selected object would appear if the at least one formatting image is selected and the at least one corresponding formatting attribute is applied to the selected first object, the at least one formatting image comprising a textual identification of the at least one corresponding formatting attribute.

13. The system of claim 11, further comprising the processing unit being operative to display a third control for selectively causing a display, adjacent to the user interface, of additional selectable controls operative to edit the selected first object.

14. The system of claim 11, wherein the subset of the plurality of functionalities is associated with a picture object.

15. The system of claim 14, wherein the subset of the plurality of functionalities associated with the picture object comprises functionalities associated with at least one of the following: a paste control, a copy control, a position control, and a reset control.

16. A computer readable storage medium storing computer executable instructions which when executed by a computer perform a method for providing a contextually relevant user interface, the method executed by the computer executable instructions comprising:

upon receiving a selection of a first object for editing within a document, displaying the contextually relevant user interface adjacent to the selected first object;

displaying, in the user interface, a first context identification control for identifying a first context of the user interface based on at least one first attribute of the selected first object;

displaying, in the user interface, a second context changing control for changing the first context of the user interface to a second context of the user interface based on at least one second attribute of a second object within the document, the second control being operative to provide a plurality of available contexts simultaneously which, upon selection of one of the plurality of available contexts, causes a replacement of the first context populating the user interface with the second context, each of the plurality of available contexts being associated with an attribute of an unselected object within the document; and displaying, in the user interface, at least one selectable control representing a subset of a plurality of functionalities, wherein the subset of the plurality of functionalities comprises at least a first functionality of the plurality of functionalities that is at least substantially the most used in editing objects of a same type as the selected first object.

17. The computer readable storage medium of claim 16, further comprising displaying the at least one selectable control in the user interface hierarchically based on frequency of previous use.

18. The computer readable storage medium of claim 16, further comprising, displaying, in response to a selection of the second control, the second context associated with the selection of the second control, the second context comprising a second subset of the plurality of functionalities, the second subset of the plurality of functionalities comprising functionalities that are at least substantially used in editing objects of a same type as the second object.

19. The computer readable storage medium of claim 16, further comprising displaying in the user interface a third control for causing a display, adjacent to the user interface, of a plurality of additional selectable controls operative to edit the selected first object.

20. The computer readable storage medium of claim 16, wherein displaying the at least one selectable control comprises displaying the at least one selectable control further representing functionality of the software operative to edit the selected first object.

21. The computer readable storage medium of claim 16, wherein displaying, in the user interface, the at least one selectable control representing the subset of a plurality of functionalities comprises displaying, in the user interface the at least one selectable control representing the subset of the plurality of functionalities associated with a picture object.

22. The computer readable storage medium claim 21, wherein the subset of the plurality of functionalities associated with the picture object comprises functionalities associated with at least one of the following: a paste control, a copy control, a position control, and a reset control.

23. The computer readable storage of claim 16, further comprising providing a gallery of formatting images in response to a selection of the at least one selectable control, the gallery of formatting comprising at least one formatting image associated with at least one corresponding formatting attribute to be applied to the selected first object, wherein the at least one formatting image provides a visual representation of how the selected object would appear if the at least one formatting image is selected and the at least one corresponding formatting attribute is applied to the selected first object, the at least one formatting image comprising a textual identification of the at least one corresponding formatting attribute.

24. The computer readable storage medium of claim 16, further comprising applying the at least one corresponding formatting attribute associated with the at least one formatting image to the selected first object in response to a selection of the at least one formatting image.

25. The computer readable storage medium of claim 24, wherein providing the gallery of formatting images includes providing the gallery of formatting images within a second user interface deployed adjacent to the contextually relevant user interface.

26. A computer readable storage medium storing computer executable instructions which when executed by a computer perform a method for providing a contextually relevant user interface, the method executed by the computer executable instructions comprising:

upon receiving a selection of first object for editing within a document, displaying a first user interface near the selected first object in a software application workspace, wherein receiving the selection comprises one of the following: detecting that a cursor is focused on the first object, receiving a cursor selection of the first object, and receiving a keyboard shortcut;

persisting a display of the contextually relevant user interface without preventing the software application workspace from executing further operations on the selected first object;

displaying in the first user interface a first context identification control for identifying a context of the user interface based on at least one first attribute of the selected first object;

displaying in the first user interface a first set of selectable controls representing a first subset of a plurality of functionalities, the first subset of the plurality of functionalities comprising at least one first functionality that is at least used in editing objects of a same type as the selected first object, wherein displaying the first set of selectable controls representing the first subset of the plurality of functionalities comprises displaying the first set of selectable controls hierarchically based on frequency of previous use;

displaying in the first user interface a second context changing control for changing the context of the user interface for editing a second object within the document, the second control being operative to, upon selection, provide a drop-down listing of a plurality of available contexts simultaneously which, upon selection of one of the plurality of available contexts, causes a replacement of a current context populating the user interface with the selected available context, each of the plurality of available contexts being associated with an attribute of an unselected object in the document;

displaying in the first user interface a second set of selectable controls representing a second subset of the plurality of functionalities in response to a selection of an available context provided by the second control for changing the context of the first user interface, the second subset of the plurality of functionalities comprising at least one second functionality that is at least substantially used in editing objects of a same type as the available object associated with the selected available context;

displaying in the first user interface a third control for causing a display in a second user interface of a third set of selectable controls operative to edit the selected first object;

displaying in the second user interface, in response to a selection of the third control, the third set of selectable controls;

providing a gallery of formatting images in response to a selection of at least one selectable control of the third set of selectable controls, the gallery of formatting images comprising at least one formatting image associated with at least one corresponding formatting attribute to be applied to an applicable one of the first object and the second object upon selection of the at least one formatting image, wherein providing the gallery of formatting images includes providing the gallery of formatting images within the second user interface, and wherein the at least one formatting image provides a visual representation of how the applicable object would appear if the formatting image is selected and the at least one corresponding formatting attribute is applied to the applicable object, the at least one formatting image comprising a textual identification of the at least one corresponding formatting attribute; and applying the at least one corresponding formatting attribute associated with the at least one formatting image to the applicable object in response to a selection of the at least one formatting image.

27. The computer readable storage medium of claim 26, wherein displaying, in the first user interface, the first set of selectable controls representing the first subset of a plurality of functionalities comprises displaying, in the user interface the first set of selectable controls representing the first subset of the plurality of functionalities associated with a picture object.

28. The computer readable storage medium claim 27, wherein the first subset of the plurality of functionalities associated with the picture object comprises functionalities associated with at least one of the following: a paste control, a copy control, a position control, and a reset control.

* * * * *